(12) United States Patent
Cason, Jr. et al.

(10) Patent No.: US 7,890,545 B1
(45) Date of Patent: Feb. 15, 2011

(54) METHOD AND SYSTEM FOR A REFERENCE MODEL FOR AN ENTERPRISE ARCHITECTURE

(75) Inventors: William C. Cason, Jr., Austin, TX (US); Craig F. Dalton, Austin, TX (US); Jason S Morio, Austin, TX (US); Shad W. Reynolds, Austin, TX (US); Ramon Renteria, Taylor, TX (US); Stéphane Lemay, Austin, TX (US)

(73) Assignee: Troux Technologies, Austin, TX (US)

( * ) Notice: Subject to any disclaimer, the term of this patent is extended or adjusted under 35 U.S.C. 154(b) by 493 days.

(21) Appl. No.: 11/095,323

(22) Filed: Mar. 31, 2005

(51) Int. Cl.
G06F 7/00 (2006.01)
G06F 17/30 (2006.01)

(52) U.S. Cl. .............. 707/803; 804/805; 804/999.101; 804/999.102; 804/999.103

(58) Field of Classification Search ...... 707/100–103 Z, 707/803, 804, 805, 999.101, 999.102, 999.103
See application file for complete search history.

(56) References Cited

U.S. PATENT DOCUMENTS

| | | | |
|---|---|---|---|
| 5,572,732 A | 11/1996 | Fant et al. | |
| 6,226,792 B1 | 5/2001 | Goiffon | |
| 6,442,557 B1 * | 8/2002 | Buteau et al. | 707/102 |
| 6,509,898 B2 | 1/2003 | Chi | |
| 6,529,909 B1 * | 3/2003 | Bowman-Amuah | 707/10 |
| 6,611,838 B1 | 8/2003 | Ignat et al. | |
| 6,662,188 B1 | 12/2003 | Rasmussen et al. | |
| 7,103,171 B1 | 9/2006 | Annadata et al. | |
| 7,124,180 B1 | 10/2006 | Ranous | |
| 7,428,546 B2 * | 9/2008 | Nori et al. | 707/101 |
| 7,698,683 B1 | 4/2010 | Miller | |
| 2003/0088551 A1 * | 5/2003 | Tong | 707/3 |
| 2003/0110253 A1 | 6/2003 | Anuszczyk | |
| 2003/0177481 A1 | 9/2003 | Amaru | |
| 2003/0187826 A1 | 10/2003 | Kennedy et al. | |
| 2003/0208367 A1 * | 11/2003 | Aizenbud-Reshef et al. | 705/1 |
| 2003/0212640 A1 | 11/2003 | Andresen | |
| 2004/0002818 A1 | 1/2004 | Kulp | |
| 2004/0049509 A1 | 3/2004 | Keller | |
| 2004/0073655 A1 | 4/2004 | Kan et al. | |
| 2004/0111513 A1 | 6/2004 | Shen | |
| 2004/0225791 A1 | 11/2004 | Keskar et al. | |

(Continued)

OTHER PUBLICATIONS

Cbop et al., "A UML Profile for Enterprise Distributed Object Computing-Joint Final Sumbission-component Collaboration Architecture (CCA)", version 1.0b, Feb. 2002, 169 pages, OMG Document No. ad/2001-08-19, download: http://enterprisecomponent.com/docs/EdocCCA.pdf.*

(Continued)

*Primary Examiner*—Jean B. Fleurantin
*Assistant Examiner*—Hares Jami
(74) *Attorney, Agent, or Firm*—Sprinkle Ip Law Group

(57) ABSTRACT

Systems and methods for a reference model for the representation of an arbitrarily complex enterprise architecture are disclosed. These systems and methods provide a reference model composed of component types and relationship types useful in modeling an enterprise architecture. The reference model may be constructed according to a set of domains. A set of component types associated with each of these domains may be defined and relationship types defined for these component types. A data model of a particular enterprise architecture may then be instantiated using this reference model.

18 Claims, 23 Drawing Sheets

U.S. PATENT DOCUMENTS

| | | | |
|---|---|---|---|
| 2004/0260706 A1 | 12/2004 | Anonsen et al. | |
| 2005/0033762 A1* | 2/2005 | Kasravi et al. | 707/102 |
| 2005/0138039 A1* | 6/2005 | Hagen | 707/100 |
| 2005/0203920 A1 | 9/2005 | Deng | |
| 2006/0106796 A1 | 5/2006 | Venkataraman | |
| 2006/0136437 A1* | 6/2006 | Yamasaki | 707/100 |
| 2006/0167927 A1 | 7/2006 | Edelstein | |
| 2006/0195460 A1* | 8/2006 | Nori et al. | 707/100 |
| 2006/0212487 A1 | 9/2006 | Kennis et al. | |
| 2006/0277022 A1 | 12/2006 | Pulfer | |
| 2006/0294148 A1 | 12/2006 | Brunet | |
| 2007/0192415 A1 | 8/2007 | Pak | |
| 2007/0282916 A1 | 12/2007 | Albahari et al. | |
| 2010/0169380 A1 | 7/2010 | Miller | |

OTHER PUBLICATIONS

Du et al., "XML structures for relational data", Web Information Systems Engineering, 2001. Proceedings of the Second International Conference on (0-7695-1393-X), Dec. 3-6, 2001. vol. 1;p. 151-160. downlaod: http://ieeexplore.ieee.org/stamp/stamp.jsp?isnumber=21506&arnumber=996476&punumber=7824.*

Office Action in U.S. Appl. No. 11/117,039, mailed Mar. 15, 2010, 31 pages.

Office Action in U.S. Appl. No. 11/805,873, mailed Mar. 15, 2010, 13 pages.

Gomik, "UML Data Modeling Profile", 2002, Rational corp., TP162, pp. i-ii, 1-11, May 2002.

Cbop et al., "A UML Profile for Enterprise Distributed Object Computing—Joint Final Submission—Component Collaboration Archicatures (CCA)", OMG Document No. ad/2001-08-19, http://enterprisecomponent.com/docs/EdocCCA.pdf, 169 pages, Feb. 2002.

Office Action mailed Aug. 4, 2009 for U.S. Appl. No. 10/802,304, 10 pages.

Office Action mailed Aug. 17, 2009 for U.S. Appl. No. 11/117,039, 27 pages.

Office Action mailed Sep. 11, 2009 for U.S. Appl. No. 11/805,873, 10 pages.

Office Action issued in U.S. Appl. No. 10/803,133 mailed Oct. 4, 2006.

Office Action issued in U.S. Appl. No. 10/802,304 mailed Jan. 9, 2008.

Office Action issued in U.S. Appl. No. 10/802,304 mailed Jun. 18, 2007.

Office Action issued in U.S. Appl. No. 10/802,304 mailed Jun. 30, 2008.

Office Action issued in U.S. Appl. No. 10/803,133 mailed May 17, 2007.

Office Action issued in U.S. Appl. No. 10/803,133 mailed Nov. 2, 2007.

Office Action issued in U.S. Appl. No. 10/803,133 mailed May 28, 2008.

Office Action issued in U.S. Appl. No. 10/802,178 mailed Sep. 5, 2007.

Office Action issued in U.S. Appl. No. 10/802,178 mailed Aug. 19, 2008.

Office Action issued in U.S. Appl. No. 11/198,649 mailed Apr. 29, 2008.

Office Action issued in U.S. Appl. No. 11/117,039 mailed Aug. 20, 2008.

Office Action issued in U.S. Appl. No. 10/803,133 mailed Oct. 7, 2008.

Muller, Robert, "Database Design for Smarties Using UML for Data Modeling", Morgan Kaufmann Publishers, 265 pages, 1999.

U.S. Patent and Trademark Office, Office Action issued in U.S. Appl. No. 11/198,649 mailed Feb. 27, 2009, Clayton Duvall, 11 pages.

U.S. Patent Office Official Action issued Mar. 3, 2008 in U.S. Appl. No. 10/802,178, Clint Miller.

Office Action issued U.S. Appl. No. 11/929,157, mailed Jun. 16, 2010, 13 pages.

* cited by examiner

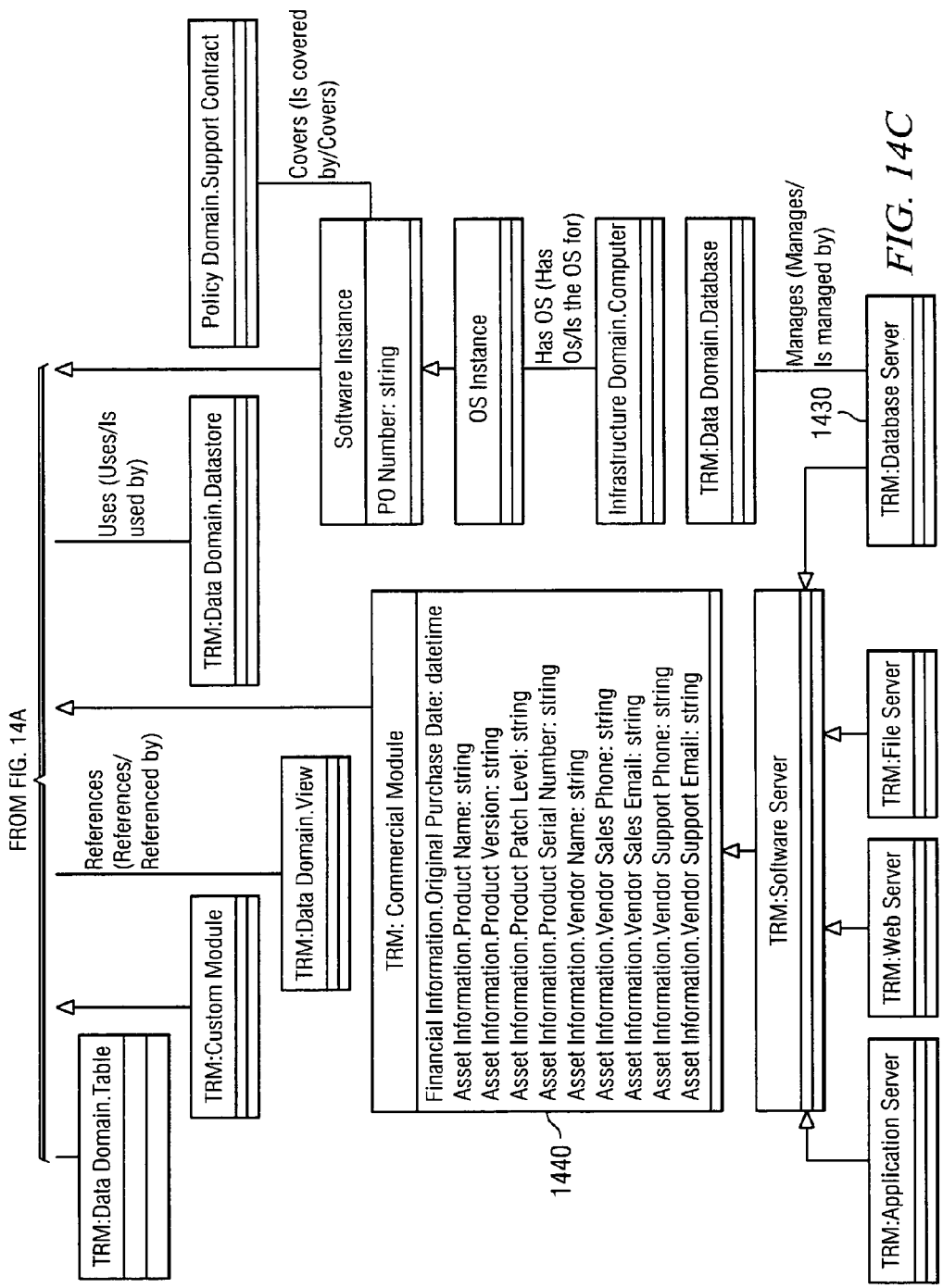

METHOD AND SYSTEM FOR A REFERENCE MODEL FOR AN ENTERPRISE ARCHITECTURE

RELATED APPLICATIONS

This application is related to U.S. patent application Ser. Nos. 10/802,304, entitled "Method and System for A Generic Data Model" by Miller et al., filed on Mar. 17, 2004; 10/803,133, entitled "Method and System for Querying an Applied Data Model" by Miller et al., filed on Mar. 17, 2004 and 10/802,178, entitled "Method and System for Discovering Relationships" by Miller et al., filed on Mar. 17, 2004. All applications cited within this paragraph are assigned to the current assignee hereof and are fully incorporated herein by reference.

TECHNICAL FIELD OF THE INVENTION

The invention relates in general to data modeling, and more particularly, to a reference model for modeling an arbitrarily complex enterprise architecture.

BACKGROUND OF THE INVENTION

The world is comprised of a wide and varied assortment of environments and subsystems. Akin to the proverbial butterfly flapping its wings in China and causing a hurricane over Texas, miniscule changes to one part of an environment may have catastrophic ripple effects in a distant part of the same environment. To anticipate these effects, it is helpful to study the ramifications of a change before it occurs, and to study these ramifications it is useful to create a model of the environment. This model can then be used to discover the consequences of a change, and the combinatorial effects of multiple alterations to the environment. Additional benefits of such a model are rationalization of the technology portfolio, and assessment and management of various regulatory and business continuity risks.

However, because of the varied nature of their composition, many types of environments do not lend themselves to modeling. A microcosm of this problem occurs in many enterprise architectures. These enterprise architectures may be intended to have a wide variety of uses: disseminating information about goods and services offered through a site on the World Wide Web, achieving objectives related to a business concern, providing a programming infrastructure for development of software, or keeping track of sales and sales force information.

Consequently, these enterprise architectures grow organically, sewn together in a Frankenstinian manner from a variety of heterogeneous machines and applications. Predicting the effects of business initiatives process and organization, the interaction of application, infrastructure and data organization within an IT environment etc. on these enterprise architecture is almost an exercise in futility without some sort of model. However, modeling these types of enterprise architectures is a daunting prospect.

Typically, there are two approaches to creating models for these enterprise architectures. The first is to create a diagram or a spreadsheet based inventory of the items of interest. This approach is problematic, creating these models requires an in depth evaluation of an enterprise architecture and manual creation of the documents, and whole document retention systems must be kept in place to version and store the documents associated with these types of models. Additionally, changes to the enterprise architecture wreak havoc on these models. The effects from these changes must be manually traced through each of the diagrams, which are not only particularly prone to errors, but time consuming as well. Other problems with storing these models in documents include that there may be a large number of users who need to be able to access and modify these documents, and documents of this type don't lend themselves to concurrent modification, and that it is very difficult to cross-reference information across these documents.

The second approach, equally problematic, is to store items of interest within an enterprise architecture in a relational database. Models created with these relational database tables, however, are particularly susceptible to changes in the enterprise architecture itself. Adding layers, applications, dependencies, projects, geographical locations etc. to an enterprise architecture may require changes to the table schema implementing the model, which may in turn may entail revising all the SQL statements used to implement the database.

Thus, a need exists for methods and systems for a data model which can model an arbitrarily complex enterprise architecture, and which is easily extensible to allow the representation of any desired logical or physical entity and the associations and dependencies between these entities.

SUMMARY OF THE INVENTION

Systems and methods for a reference model for the modeling of an enterprise architecture are disclosed. These systems and methods may provide a reference model composed of a logically structured taxonomy of component types, relationship types and property types with which to create a data model. In addition, the cardinality of the relationships between the component types may be defined as a constraint on the model. The reference model may be based on logical or physical groupings or associations of entities within an enterprise architecture and provide the ability to capture the state of any enterprise architecture, represent this enterprise architecture, and dynamically accommodate changes to the environment with a minimum of impact on the model of the environment, the underlying data structures themselves or the way these data structures are stored and represented.

In one embodiment, the enterprise architecture is segmented into a set of domains, a set of component types is defined for each domain and a set of relationship types is defined.

In another embodiment, each set of component types comprises subtypes of a generic component.

In yet another embodiment, each set of component types comprises a domain component which is a subtype of the generic component and a parent of the other component types in the set.

In still another embodiment, the set of component types contains an abstract component type.

In other embodiments, the domain component is associated with properties characteristic of the domain.

In still other embodiments, the domains are determined based on empirical analysis of the enterprise architecture.

In yet other embodiments, the set of domains comprises process, initiative, organization, application, location, infrastructure, data and policy.

In some embodiments, the set of relationship types comprises intradomain and interdomain These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DESCRIPTION OF PREFERRED EMBODIMENTS

Figure 1:
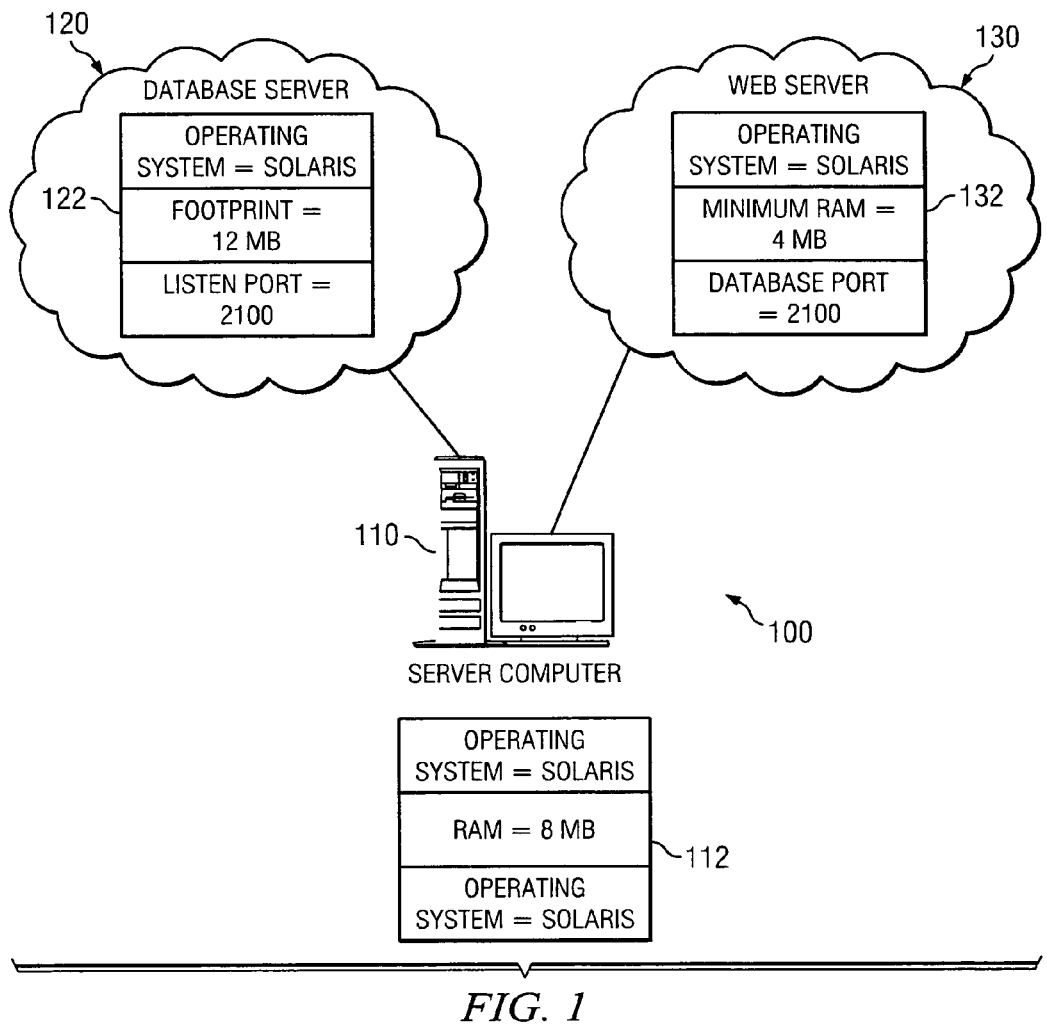
FIG. 1 includes an illustration of a simple IT environment.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements).

A few terms are defined or clarified to aid in an understanding of the terms as used throughout the specification. The term "component" is intended to mean a representation of any definable, logical or physical entity. A component may have a group of properties. In an IT environment, an entity may be any portion of the environment desired to be represented, including hardware, such as a server or database, applications which may reside on one or more actual machines, virtual data repositories, firmware and the like. Many levels of abstraction are possible. For example, a network may be represented as a component, a subnetwork of that network may be represented as a component, a server on the subnetwork may also be represented as a component, an application running across that server and other servers may also be represented as a component, a table within that application may be represented as a component, etc.

The term "relationship" is intended to mean a representation of an association or dependency between two or more components. This association may be based on the property values of the components.

The term "set", when used in the mathematical sense as in "a set of" is intended to mean a collection of zero or more elements.

The term "check" is intended to mean a determination whether a relationship is valid, or a determination regarding the value or validity of a property of a component. Checks may be associated with components or relationships. In some cases a check is a piece of software which may be associated with a relationship or component. A check may have an output event, such as an email or notification.

The term "property" is intended to mean a characteristic associated with a component or a relationship. This property may have a name and a value associated with it, and components of the same type may have different values for the same property.

The term "type" is intended to mean a category of a relationship or a component. All relationships or components of the same type will have the same properties, though each instance of a component or a relationship may have different values for those properties. For example, a component type named "ComputerType" may be defined, having the properties of "RAM" and "OSType". Each instance of component type "ComputerType" will have the properties "RAM" and "OSType", however in one instance the value of "RAM" may be 4 megabytes, while in another instance the value of "RAM" may be 8 megabytes.

The term "data model" is intended to mean a model for representing anything in the physical world, coupled with logic pertaining to that representation.

The term "reference model" is a structure or taxonomy of component types, relationship types, the cardinality constraints of those relationships or property types for use in modeling a particular environment to which the reference data model pertains.

The term "domain" refers to a grouping. This grouping may be according to any criteria, including a physical, logical or operational association. These groups may be abstract types with a set of common characteristics.

The term "subtype" is intended to mean a specialization of a particular type of component or relationship. For example, a component type "computer" may be defined with certain properties. A more specialized version of the "computer" type may be represented as a subtype of "computer" called "server computer". The subtype "server computer" will inherit all the properties of its parent type "computer". A subtype is also a type; consequently subtypes may themselves be parents of subtypes.

The term "enterprise architecture" is intended to mean the elements of an enterprise, the design of these elements, their relationships and how they support the objectives of that enterprise.

Before discussing embodiments of the present invention, a non-limiting, simple IT environment used in depicting embodiments and examples is briefly described. After reading this specification, skilled artisans will appreciate that many other more complicated environments may be utilized with embodiments of the present invention.

FIG. 1 includes a diagram of a simple IT environment 100. IT environment 100 includes a server computer 110. Server computer 110 may comprise a central processing unit ("CPU"), a read-only memory ("ROM"), a random access memory ("RAM"), a hard drive ("HD") or storage memory, and I/Os. ROM, RAM, HD and storage memory are exemplary forms of computer readable storage media. I/Os can include a keyboard, monitor, printer, electronic pointing device (e.g., mouse, trackball, stylus, etc.), or the like. Server computer 110 may also be executing an operating system as is commonly known in the art. Server computer 110 may have a set of attributes 112, such as the type of operating system executing on server computer 110, amount of RAM, amount of free storage space and the like.

IT environment 100 may further contain database server application 120 and web server application 130. Database server application 120 and web server application 130 may have certain attributes 122, 132 which pertain to their particular implementation. For example, each may utilize certain storage resources, have a certain filesystem structure, require a certain operating environment, and have a certain footprint. Other attributes will be readily apparent to those of ordinary skill in the art. Each of these software applications 120, 130 may be executing on server computer 110. Additionally each of the computers in FIG. 1 may have more than one CPU, ROM, RAM, HD, I/O, or other hardware components. Note that FIG. 1 is a simplification of an exemplary hardware configuration. Many other alternative hardware configurations are possible and known to skilled artisans.

Attention is now directed to methods and systems for a reference model for the modeling of an enterprise architecture, and how this reference model may be utilized to represent an arbitrarily complex enterprise architecture. These systems and methods may provide a reference model composed of a logically structured taxonomy of component types, relationship types and property types with which to create a data model. An enterprise architecture may then be modeled utilizing component types, components, relationship types, relationships and properties based on this reference data model. The reference model (and structures instantiated from the reference model) may be based on logical or physical groupings or associations and provide the ability to capture the state of any enterprise architecture, represent this enterprise architecture, and dynamically accommodate changes to the environment with a minimum of impact on the model of the environment, the underlying data structures themselves or the way these data structures are stored and represented. Though various simple example environments will be used to demonstrate the power and flexibility of the reference data model, after reading this disclosure it will be apparent to those of ordinary skill in the art that a reference data model of this type may be utilized to model any arbitrarily complex enterprise architecture.

In an illustrative embodiment of the invention, the computer-executable instructions may be lines of assembly code or compiled $C^{++}$, Java, or other language code. Other architectures may be used. Additionally, a computer program or its software components with such code may be embodied in more than one data processing system readable medium in more than one computer.

Figure 2:
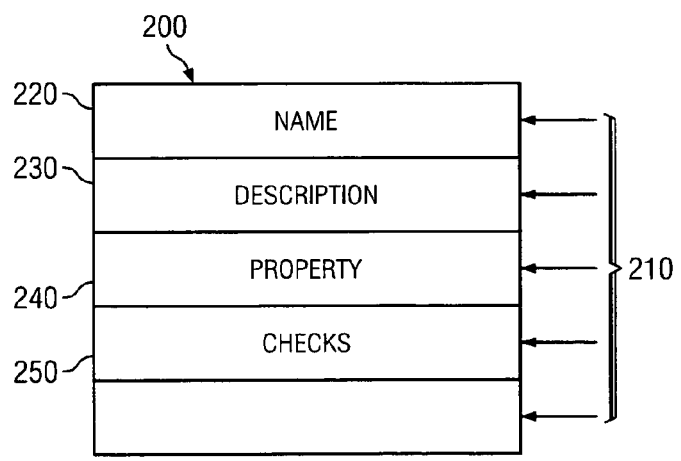
FIG. 2 includes a representation of a component.

Turning now to FIG. 2, a graphical representation of a component data structure is presented. Component 200 is a generic component which may be used to represent a logical or physical entity within an environment. Component 200 may have a set of fields 210 which contain information relating to the entity associated with component 200. Fields 210 may include a field for name 220, description 230, properties 240 and checks 250. Various other fields 210 may be included to further define component 200. Name field 220 may be used to particularly associate component 220 with a specific physical or logical entity. Description field 230 may further identify component 200, associate component 200 with a particular entity, or allow component 200 to be associated with a particular component type (as explained below).

Property field 240 may be used to represent the attributes or characteristics of the physical or logical entity represented by component 200, or with which component 200 is associated.

Property field 240 may be associated with one or more properties, a property may consist of a property name which may be associated with a value. This value in turn may correspond to an attribute of the physical or logical entity represented by component 200. A property may be a string, boolean, decimal number, date/time, or an enumerated type, which describes the category of values a particular property may have. In one embodiment, a property may in turn be a data structure which has a name, a description, and a value. This data structure may then be given values based on an attribute of the entity represented by component 200.

Component 200 may also be related to a set of checks 250. A check may be a piece of logic which performs operations based on a certain set of conditions. These operations may consist of checking on the status of certain relationships associated with the component 200 (as described below), checking the status of certain properties 240, and other operations which will be readily apparent. These pieces of logic may be configured to operate automatically at certain time intervals, or may be applied at any point according to a variety of different triggering conditions which will be apparent to one of ordinary skill in the art after reading this disclosure.

Referring briefly back to FIG. 1, component 200 may be used to represent any object in IT environment 100. To represent server computer 110, name field 220 may be set to "server1", description 230 may be set to "server computer", property field 240 may contain three properties "OSType", "RAM", and "FreeStorage", which may be assigned the values corresponding to attributes 112 of server computer 110, "Solaris", "8 MB" and "6 MB" respectively.

Similarly, component 200 may represent database server 120; name field 220 may be set to "DB1", description 230 may be set to "database server application", property field 240 may contain three properties "OSType", "Footprint", and "Listen Port", which may be assigned the values corresponding to attributes 122 of database server 120, "Solaris", "12 MB" and "2100" respectively. As can be seen, component 200 may represent any entity, whether logical or physical equally well.

Figure 3:
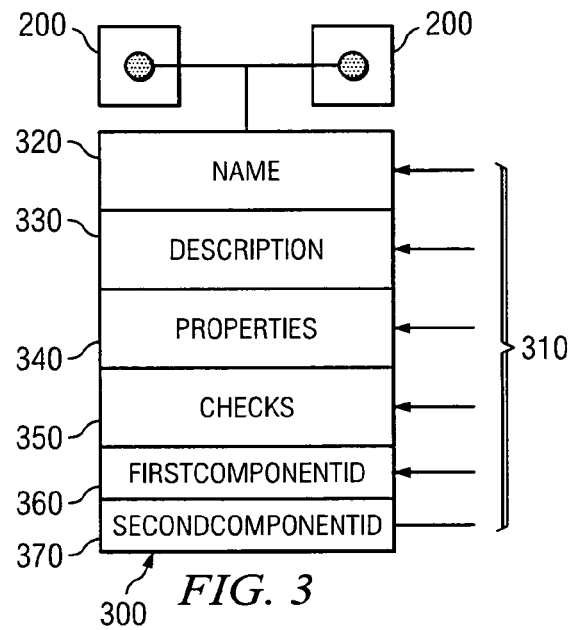
FIG. 3 includes a representation of a relationship.

Turning now to FIG. 3, a graphic representation of a relationship is depicted. Relationship 300 may be used to represent an association or dependency between two or more components 200. Relationship 300 may have a set of fields 310 which contain information pertinent to an association or dependency between two components. Fields 310 may include a field for name 320, description 330, property 340, and checks 350 as described above with respect to component 200. Name field 320 may be used to particularly associate relationship 300 with two or more physical or logical entities. In one embodiment, the name associated with name field 320 may be built programmatically based on the relationship type name and the names of the two components it is connecting. So, a "runs on" relationship type exists between components "app1" and "server1", the relationship name may be built automatically as "app1 runs on server1". That way, if either of the components' names changes, the relationship name may automatically changes to reflect this. Description field 230 may further distinguish relationship 300, associate relationship 300 with components, or allow relationship 300 to be associated with a particular relationship type (as explained below). Property field 340 may allow attributes of the relationships, dependencies between the relationships, or associations between the relationships, to be represented by a name and value pair. Checks 350 may contain one or more pieces of logic which perform operations based on certain set of conditions, as described above with respect to relationship 300. In a particular embodiment, fields 310 include fields 360, 370 to identify components 200 to which relationship 300 corresponds. Various other fields 310 may be included to further define relationship 300. In one embodiment, a relationship may have cardinality, such that a relationship may only represent an association or dependency between particular types or particular number of components.

Returning for a moment to FIG. 1, relationship 300 may be used to represent any association between the logical or physical entities in IT environment 100. Component 200 may be used to represent database server 120 and server computer 110, as described above. Continuing with the above example, relationship 300 may be used to represent that database server 120 executes on server computer 110. Description 330 may be set to "runs on", property field 340 may contain a property "StartDate" which may be assigned the values corresponding to the date on which database server 120 began executing on server computer 110. To identify the components associated by relationship 300, FirstComponentID field 360 may be set to a name corresponding to server computer 110, in this example "server1"; likewise, SecondComponentID field 370 may be associated with component 200 representing database server 120. In one embodiment, row ids in a table are used to associate components with a relationship, thus, if a component is renamed relationships referencing this component do not have to be altered. As can be seen, relationship 300 may represent any association or dependency between any two or more logical or physical entities equally well.

However, as can be readily imagined, instantiation and definition of components and relationships for a complex environment may be a manually intensive process. To alleviate these concerns, in one embodiment, a typing system is included to allow the ability to define a hierarchy of component and relationship types which may serve as templates to instantiate components or relationships of these different types.

Figure 4:
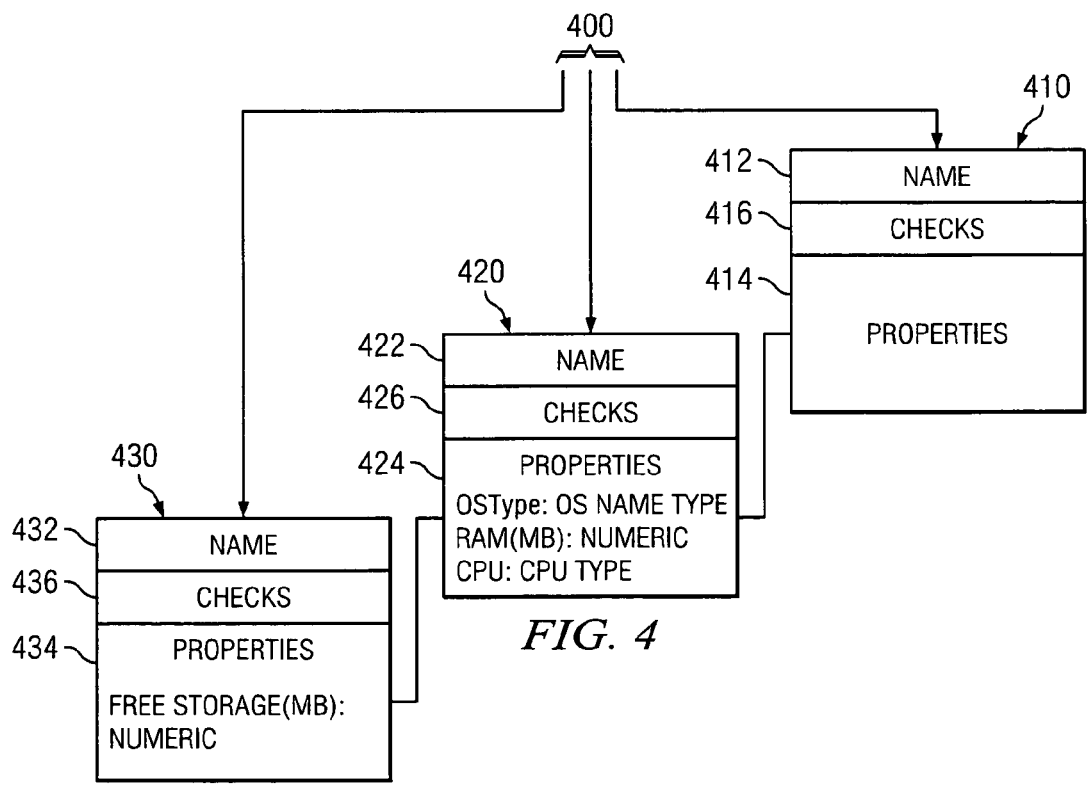
FIG. 4 includes a representation of a hierarchy of component types.

A hierarchy 400 of component types 410, 420, 430 is depicted in FIG. 4. Types 410, 420, 430 may provide different templates for instantiation of different components. Types, 420, 430 may have additional fields depending on the intended use of a component instantiated from the type. A component may be instantiated from a type and values assigned to the fields of the component based upon the physical or logical entity represented by the component.

Generic component type 410 may have a set of fields as described above. These fields may include a name and description 412, a set of properties 414, and a set of checks 416. A generic component may be instantiated from generic component type 410, and used to represent an atomic entity. For example, in order to represent server computer 110, a user may instantiate component 200 from generic component type 410, name component 200, define the list of properties pertinent to server computer 110, give these properties values based on the attributes of server computer 110, define checks pertinent to server computer 110, etc. In this manner, component 200 can be created which represents server 110 accurately. However, representing a complex environment in this manner becomes labor intensive, as a component to represent each atomic entity within the environment may have to be created manually.

To remedy this problem, more specific component types may be defined which serve as templates to instantiate components which represent specific entities in an environment. For example, a computer component type 420 may be defined to serve as a template for components which represent computers. This computer component type 420 may contain properties 424 or checks 426 which are designed to represent a generic computer. A property within the set of properties 424 may contain a name and enumerated type corresponding to the values which that property may have. As expressed above, a property within the set of properties 424 may itself be a data structure; in this case a property may contain a name and a reference to a data structure. Examples of property names and their corresponding enumerated types are depicted in properties 424 of computer component type 420. Properties 424 and checks 426 will be common to all components instantiated from computer component type 420; in other words, all components instantiated from computer component type 420 will contain properties 424 and checks 426 of computer component type 420. This computer component type 420 may be used to instantiate component 200 to represent a computer in an environment, this component's 200 properties can then be assigned values based on the attributes of the computer which component 200 is intended to represent.

Figure 5:
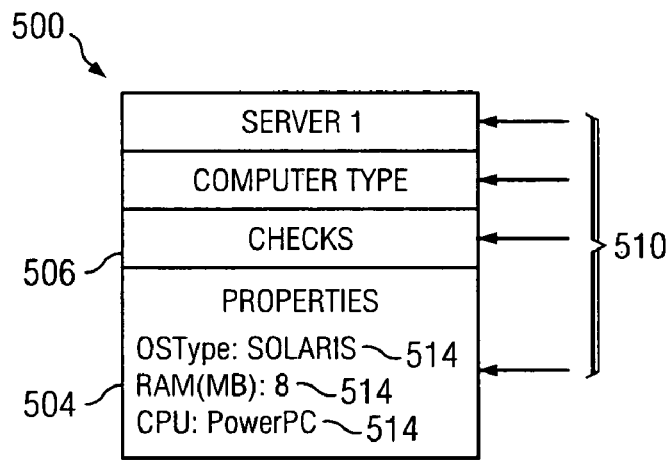
FIG. 5 includes a representation of a component instantiated from a component type.

FIG. 5 is a depiction of component 500 which has been instantiated from computer component type 420 to represent server computer 110. Component 500 has fields 510 corresponding to the fields defined by computer component type 420, including properties 504 and checks 506 contained in the type definition of computer component type 420. The values 514 of properties 504 of component 500 may correspond to characteristics or attributes 112 of server computer 110. If server computer 110 has 8 megabytes of RAM, the property named "RAM" of component 500 may be set to 8. If the operating system implemented on web server is Solaris, the value of the "OSType" property in component 500 may be Solaris, etc. In this manner, component 500 models server computer 110 by representing attributes 112 of server computer 110 with the properties 504 of component 500.

Returning now to FIG. 4, in many cases computers in an environment may perform a specialized function, such as server computer 110. To represent these specialized machines, it may be desirable to have additional properties in the components representing these specialized machines which are not present in computer component type 420. This discrepancy may be remedied manually; a component of type "computer" may be instantiated from computer component type 420 to represent server computer 110, and any specialized properties desired, but not contained, in this component may be added. Again, however, this process quickly becomes manually intensive when many specialized machines are present.

In some embodiments, a component subtype may be defined with respect to a parent component type. This component subtype represents a specialized subgroup of the respective parent component type. A component instantiated from a component subtype may inherit all the properties and checks corresponding to its respective parent component type. Consequently, when component 200 is instantiated from a component subtype, component 200 contains all the properties and checks contained in the definition of the component subtype plus all the properties and checks contained in the definition of the parent component type.

For example, computer component type 420 may be defined to serve as a template for components which represent computers. This computer component type 420 will contain checks 426 or properties 424 which correspond to a generic computer, and will be common to all components instantiated from computer type 420. A server computer component subtype 430 may be defined with respect to parent computer component type 420. This definition may include only properties 434 and checks 436 specific to server computer component subtype 430. Consequently, when a component is instantiated from server computer component subtype 430 this component will contain all the properties 424, 434 and checks 426, 436 contained in both the parent computer component type 420 and the server computer component subtype 430. For example, if component 200 were instantiated from server computer component subtype 430, component 200 would contain the properties named "OSType", "RAM", and "CPU" contained in parent computer component type 420, and the property "FreeStorage" contained in server computer component subtype 430. These properties may then be assigned values.

It will be apparent to those of ordinary skill in the art the recursive nature of this type/subtype correlation and the inheritance characteristics that accompany these correlations. For example, a subtype may be the parent type of a second subtype. In addition to containing the checks and properties defined in the second subtype, a component instantiated from the second subtype will contain the checks and properties defined in both the first subtype and the original parent. The power and flexibility of such a system will also be apparent, a component hierarchy specifically tailored to any environment can be defined from a generic component type.

As described above, relationships are used in tandem with components to model arbitrary systems and environments by representing an association or dependencies between two components. As will be readily apparent, the same reasoning that applies to components with respect to a hierarchy of types may be applied equally well to relationships. Manual instantiation of relationships may be time consuming if the representation of many dependencies or associations is necessary. Consequently, types and subtypes corresponding to a particular category of these dependencies or associations may also be defined for relationships, and relationships instantiated from these defined types and subtypes. Each relationship type may also have cardinality, such that a relationship instantiated from this relationship type may only represent an association or dependency between two particular component types or subtypes. For example, a "runs on" relationship type may be defined to exist between one component of type "application" and one component of type "server".

All principles described with respect to types and subtypes in the context of components are equally applicable to relationships, including the principle of inheritance.

In one embodiment, a relationship may have cardinality, such that a relationship may only represent an association or dependency between particular types or particular number of components. For example, a "runs on" relationship type may be defined to only exist between one component of type "application" and one component of type "server".

Figure 6:
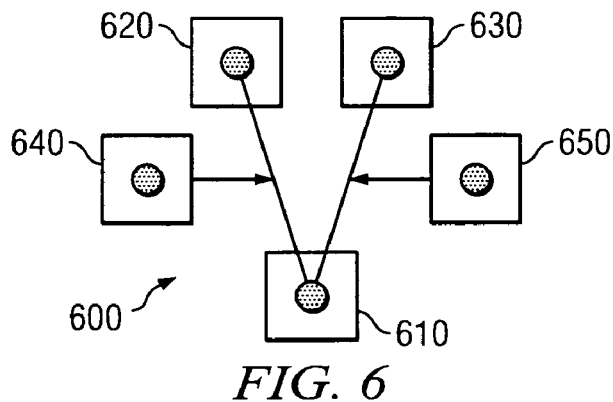
FIG. 6 includes a representation of an application of a data model to the IT environment of FIG. 1.

Moving on to FIG. 6, a representation 600 of using components and relationships to model a portion of IT environment in FIG. 1 is depicted. Component 610 represents the physical entity server computer 110 and has properties with values corresponding to attributes 112 of server computer 110. Components 620 and 630 represent logical entities database server 120 and web server 130 respectively. Properties of components 620, 630 may have values corresponding with attributes 122, 132 of database server 120 and web server 130.

Database server 120 executes on server computer 110. To represent this association, relationship 640 may be named "runs on", FirstComponentID field 360 of relationship 740 may be linked to component 620 representing database server 120, while SecondComponentID 370 may be linked with component 610 corresponding to server computer 110, and properties of relationship 640 may be defined accordingly. In this manner, the fact that database server 120 executes on server computer 110 may be modeled by relationship 640. Likewise, the fact that web server 130 also executes on server computer 110 may also be modeled. Relationship 650, also of type "runs on", may be instantiated, given properties, and associated with components 610, 630 representing web server 130 and server computer 110 using FirstComponentID field 360 and SecondComponentID field 370. This type of data model allows changes to an environment to be accommodated with a minimum of disturbance to the model of that environment. In particular embodiments, a blueprint may be used to contain the entire representation 600 of the IT environment.

Figure 7:
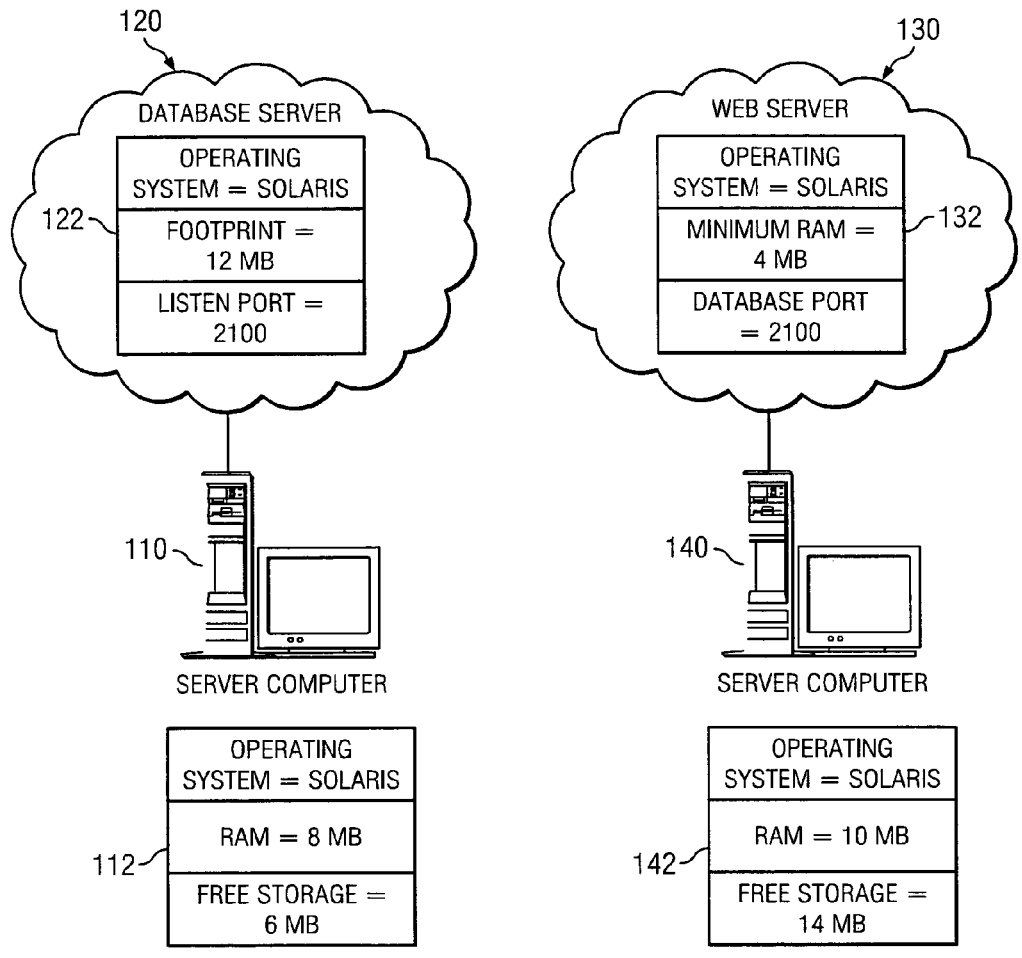
FIG. 7 includes an illustration of an alteration to the IT environment of FIG. 1.

Suppose that the IT environment depicted in FIG. 1 is altered to the IT environment depicted in FIG. 7. IT environment 100 now includes second server computer 140, with web server 130 executing on second server computer 140. Server computer 110, database server 120, and web server 130 remain unaltered, with exactly the same attributes 112, 122, 132. To represent the IT environment in FIG. 7 minimal changes to the model represented in FIG. 6 are necessary.

Figure 8:
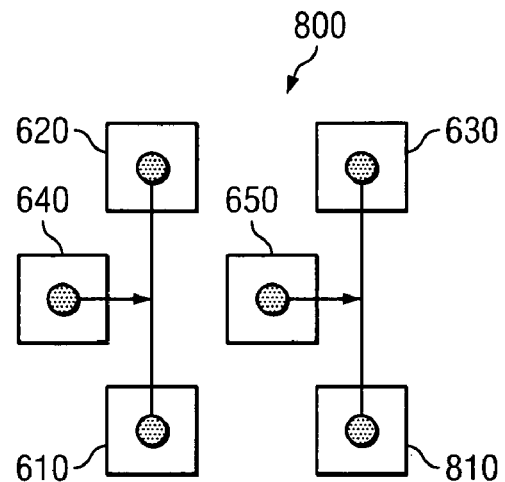
FIG. 8 includes a representation of an application of a data model to the IT environment of FIG. 7.

FIG. 8 is a representation 800 of an application of embodiments of the data model to the IT environment depicted in FIG. 7. Component 810, representing second server computer 140, has been added to the model. Properties of component 810 have values corresponding to attributes 142 of second server computer 140. Components 610, 620, 630 remain unaltered, as the entities which they represent remain unchanged. Relationship 640 also remains unaltered, as database server 120 still executes on server computer 110. Relationship 650, representing the association between web server 130 and the entity on which web server 130 executes, must be altered to accurately represent that web server 130 now executes on second server computer 140. This alteration may be accomplished simply by changing SecondComponentID field 370 of relationship 650 to an association with component 810 representing server computer 140. Relationship 650 now accurately depicts the association between web server 130 and second server computer 140. As can be seen, changes to a particular environment can be easily accommodated by the data model with a minimum of change to the actual data structures which represent the environment.

Often times while modeling a particular environment logical divisions, layers or domains become apparent within that environment. These divisions or domains, which may become apparent through theoretical or empirical analysis, provide rational basis for a conceptual separation of various portions of a particular environment and therefore may serve as a solid foundation for constructing a reference model for that environment. A reference model may be defined by identifying a set of domains which suitably encompass the physical or logical entities of an environment. Components or component types with characteristic properties may be defined to represent each of these domains. Within these domains, hierarchies of component types and relationship types may then be defined which are designed to adequately represent the components and relationships of an arbitrary environment. This reference model can then be conveniently used to model multiple discrete instances of a type of environment, while still allowing the reference model to be extensible in response to any quirks, perturbations, or variations in a particular environment, without altering the underlying schema.

Figure 9:
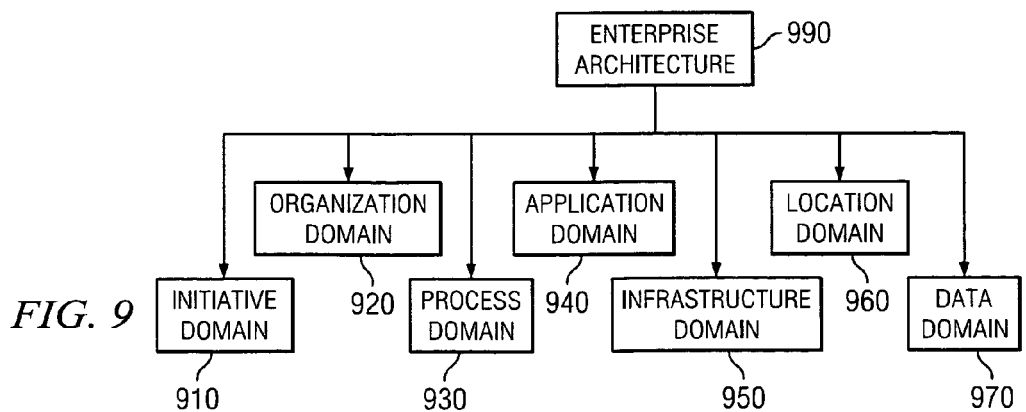
FIG. 9 includes a representation of one embodiment of a group of domains for use with an enterprise architecture.

One glaring example of the usefulness of such approach occurs in the realm of enterprise architecture. FIG. 9 represents a high level view of one particular set of domains which may encompass an enterprise architecture and may consequently be used as a baseline or guideline to further define a reference model for an enterprise architecture. Domains 910, 920, 930, 940, 950, 960 and 970 may be conceptual or logical divisions which generically encompass any particular enterprise architecture 990. A domain component type may be defined for each of domains 910, 920, 930, 940, 950, 960 and 970, and may contain properties characteristic of the domain for which the domain component type is defined. This domain component type may in turn be a subtype of a generic object or component type. Within each of these domains 910, 920, 930, 940, 950, 960 and 970 this domain component type may be used to define additional component subtypes with properties pertaining to the realm of enterprise architecture 990 encompassed by the respective domain 910, 920, 930, 940, 950, 960 and 970 to which the component type belongs. These component types may be abstract components, intended to organize the hierarchy of components. Relationship types may then be defined between the component types of the domain, these defined relationship types may be both intradomain and interdomain relationships. Collectively, the component types and relationship types associated with each of domains 910, 920, 930, 940, 950, 960 and 970 serve as a framework for instantiating components and relationships to model an arbitrarily complex enterprise architecture 990. In one particular embodiment, the component types associated with initiative domain 910, organization domain 920, process domain 930, application domain 940, infrastructure domain 950, location domain 960 and data domain 970 are all subtypes of a generic component.

Initiative domain 910 may consist of component type and relationship type definitions that are intended to be used to instantiate components that represent business initiatives or objectives. Component types and subtypes belonging to initiative domain 910 may be instrumental in modeling projects in enterprise architecture 990 down to the individual task level.

Figure 10:
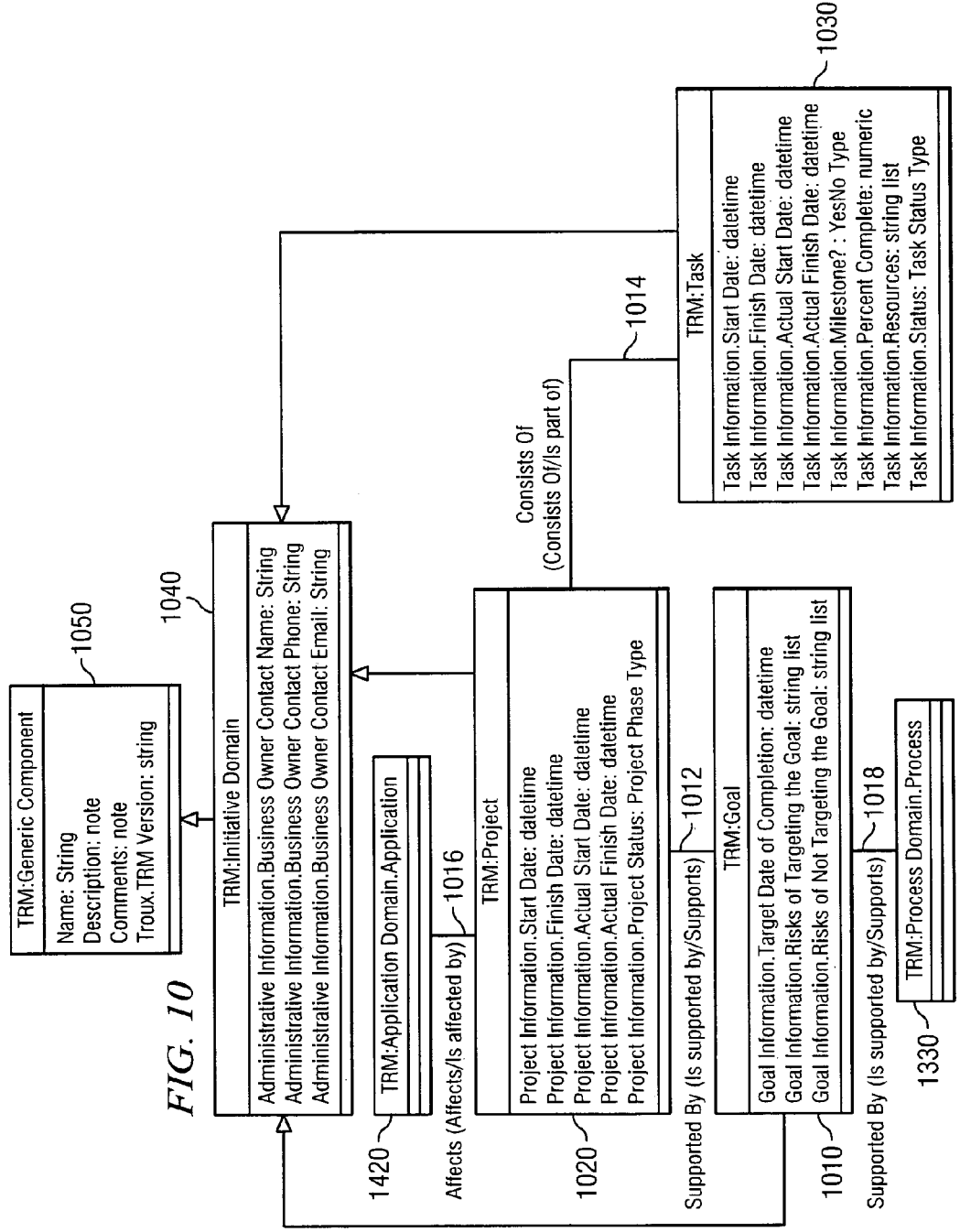
FIG. 10 includes a representation of one possible hierarchy of component types and relationship types associated with one particular domain.

FIG. 10 represents one possible hierarchy of component types and relationship types associated with initiative domain 910. This hierarchy of component types may provide different templates for representing initiatives within an enterprise architecture and for creating other component and relationship types which may be specifically tailored to an individual enterprise architecture. Component types 1010, 1020, 1030, 1040 and 1050 may have different fields depending on the intended use of a component instantiated from the type. A component may be instantiated from a component type and values assigned to the fields of the component based upon the physical or logical entity represented by the component. Relationship types 1012, 1014 may also be associated with component types 1010, 1020, 1030, 1040 and 1050 and relationships instantiated from these relationship types 1010, 1012 may then be used to represent an association between components. As mentioned before these relationships may be intradomain relationships, or interdomain relationships between component types which are subtypes of two different domains.

In one embodiment, "initiative domain" component 1040 is defined from generic component type 1050, in turn "goal" component type 1010, "project" component type 1020, and "task" component type 1030 are defined from parent "initiative domain" component type 1040. "Consists of" relationship type 1014 may be defined between "project" component type 1020 and "task" component type 1030 to represent a connection between a project in enterprise architecture 990 and the various tasks that may comprise that project. "Supported by" relationship type 1012 may be defined between "project" component type 1020 and "goal" component type 1010 to represent the connection between projects and goals related to that project that usually manifest in an enterprise architecture. Relationship types 1012, 1014 may also be defined between component types 1010, 1020, 1020, 1040 and 1050 in initiative domain 910 and component types 1330, 1420 belonging to other domains. For example, an "affects" relationship type 1016 may be defined between "project" component type 1020 in initiative domain 910 and "application" component type 1420 belonging to application domain 940, while a "supported by" relationship type 1018 may defined between "goal" component type 1010 in initiative domain 910 and "process" component type 1330 in process domain 940. Other embodiments of component types and relationship types associated with initiative domain are explained more fully in Appendix A.

Suppose, now, that a project within enterprise architecture 990 is to release a product. This product release project is composed of a number of tasks associated with the product release including a build and a first customer shipment. The target date for the build is Sep. 7, 2004 and the target date for the first customer shipment and the product release is Mar. 7, 2005.

Figure 11:
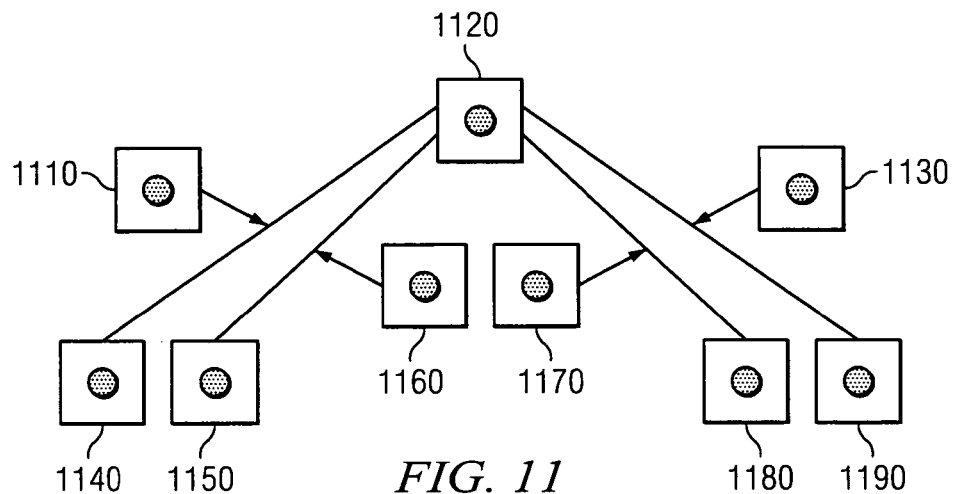
FIG. 11 include a representation of the hierarchy of FIG. 10 applied to a particular example.

FIG. 11 is a representation of an application of embodiments of initiative domain hierarchy 1000 depicted with respect to FIG. 10 applied to the example described above. Component 1120 may be instantiated from the "project" component type 1020 and represent the product release initiative, while instantiated components 1180, 1190 represent the tasks of a build and a first customer shipment, respectively. The product release goal date of Mar. 7, 2005 is represented by component 1140, while the goal target date for the build of Sep. 7, 2004 is represented by component 1150. The dependencies that exist between components 1120, 1140, 1150, 1180, 1190 are represented by relationships 1110, 1130, 1160 and 1170.

Relationships 1130, 1170 may be instantiated from "consists of" relationship type 1014, indicating that project component 1120 depends on "task" components 1130, 1170 representing the separate tasks of a build and a first customer shipment. "Project" component 1120 may be tied to "goal" components 1140, 1150 by "supports" relationships 1160, 1170, indicating that the project of a product release is supported by the goal dates of Sep. 7, 2004 and Mar. 7, 2005.

Returning for a moment to FIG. 9, other domains 920, 930, 940, 950, 960, and 970 may be implemented in a similar vein to initiative domain 910. FIGS. 12-17 represent various embodiments of hierarchies of component types and relationship types associated with domains 920-970. Other embodiments for these domains are expounded upon in Appendix A, and still others embodiments, component and relationship types and subtypes will be apparent to those of skill in the art.

Figure 12A:
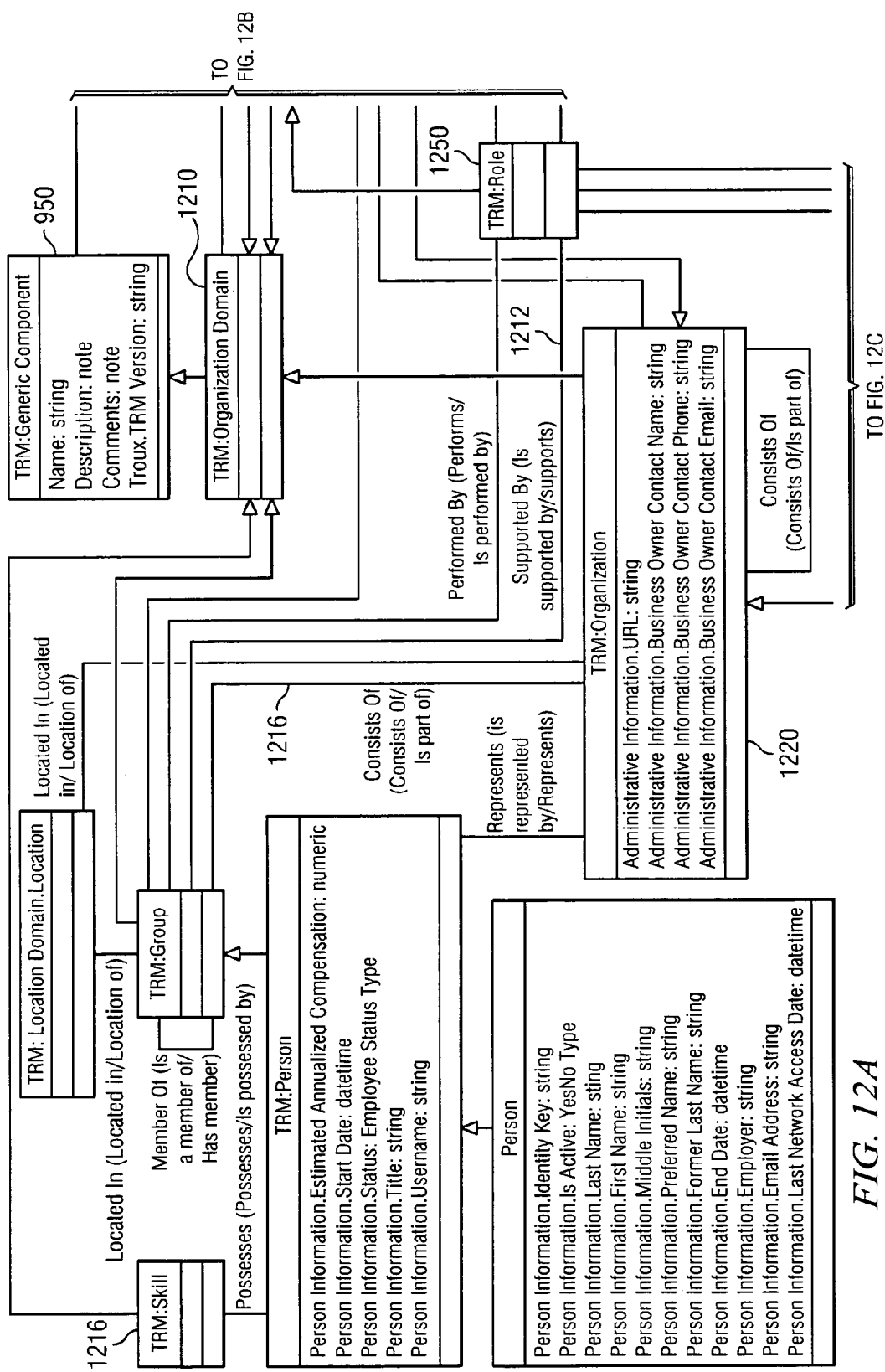
FIGS. 12-17 include representations of possible hierarchies of component types and relationship types associated with the various domains represented in FIG. 9.
Figure 12B:
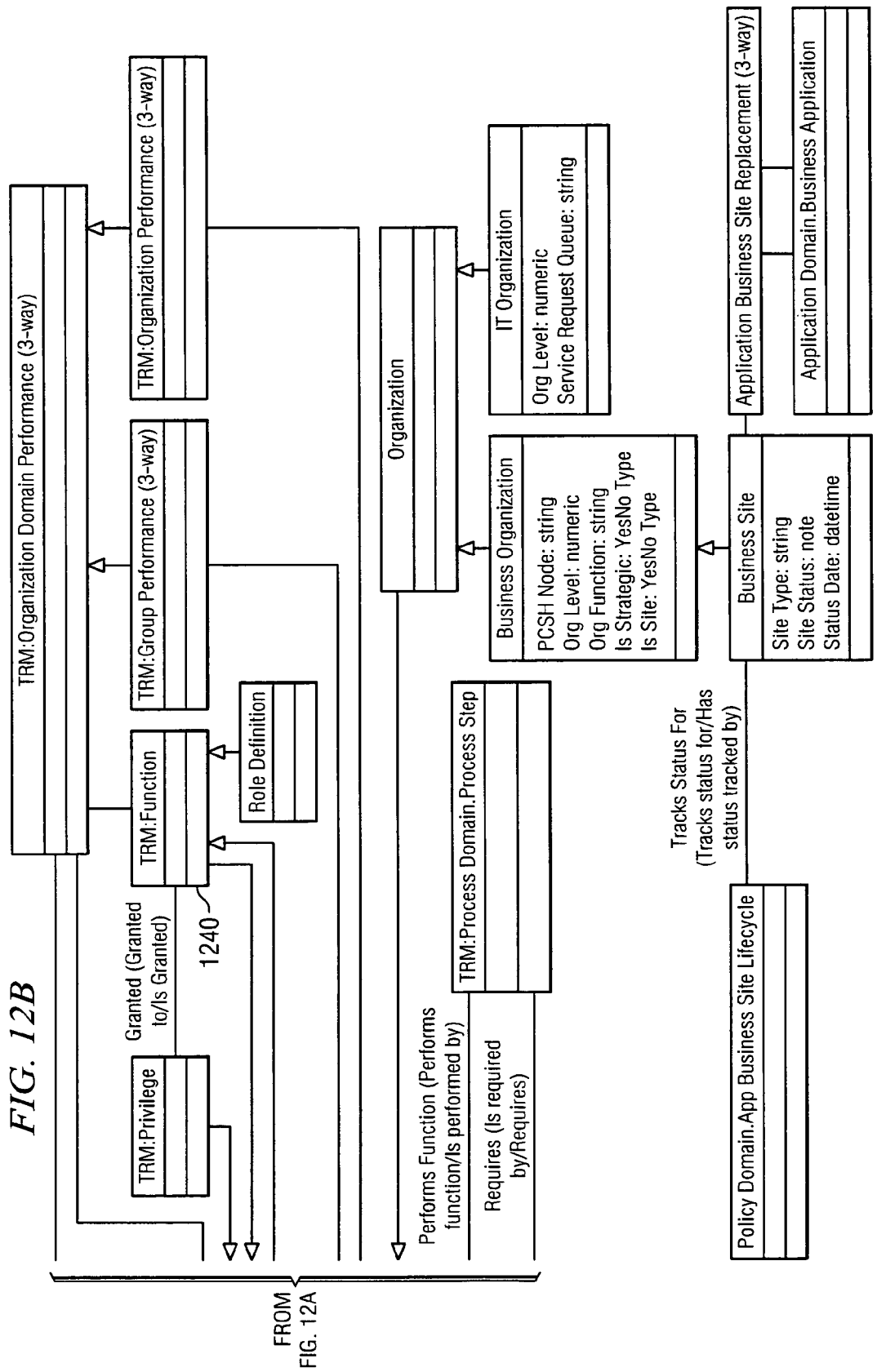
Figure 12C:
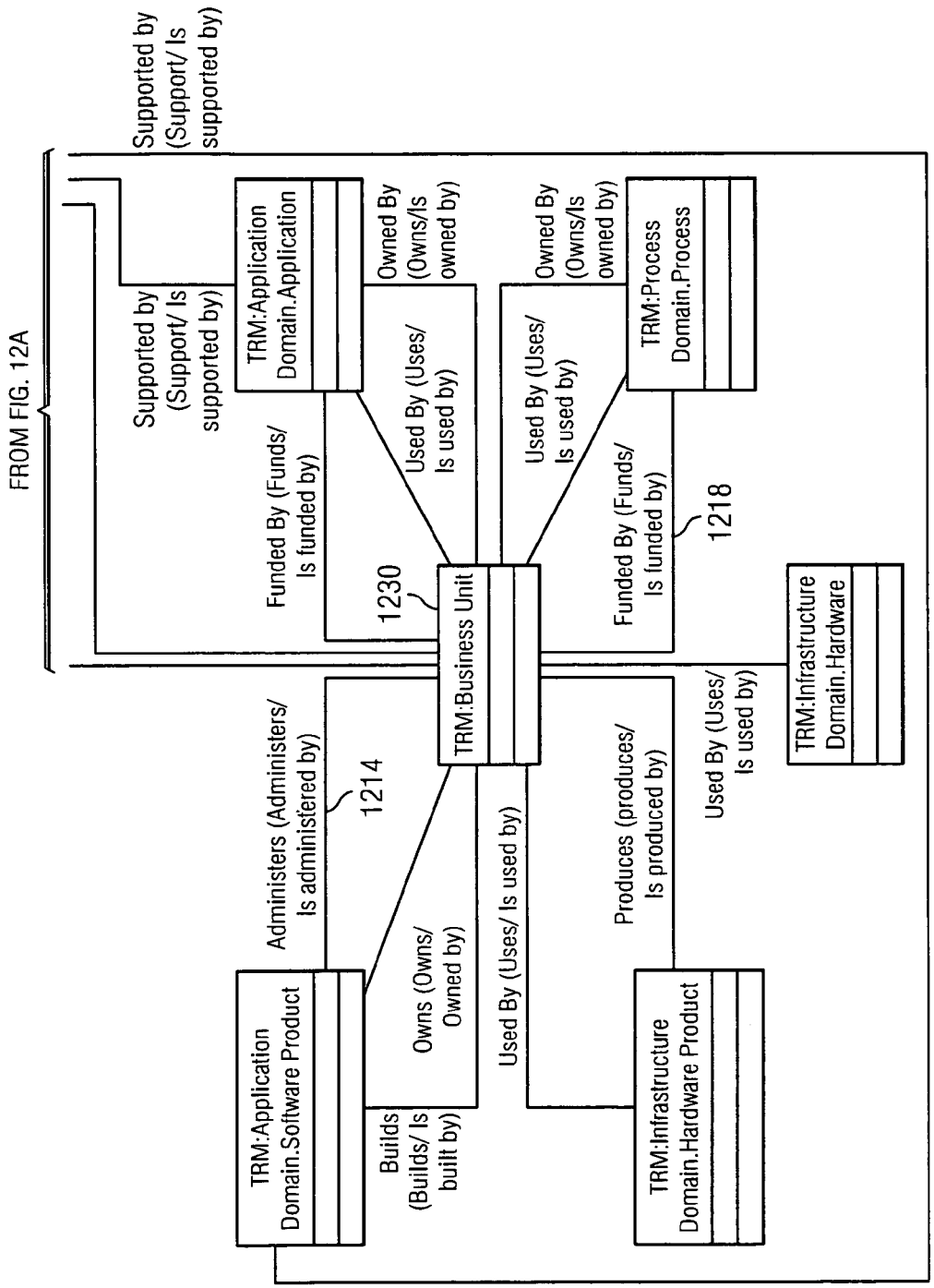

FIG. 12 represents a hierarchy of component types and relationship types associated with organization domain 920. "Organization domain" component type 1210 may be a subtype of generic component type 950 and be the basis for subtypes that represent people and organizations within enterprise architecture 990. These subtypes may include "organization" component type 1220, "business unit" component type 1230, "function" component type 1240 and "role" component type 1250. Relationship types between components associated with organization domain 920 include "supported by" relationship type 1212, "administers" relationship type 1214, "consists of" relationship type 1216 and "funded by" relationship type 1218.

Figure 13:
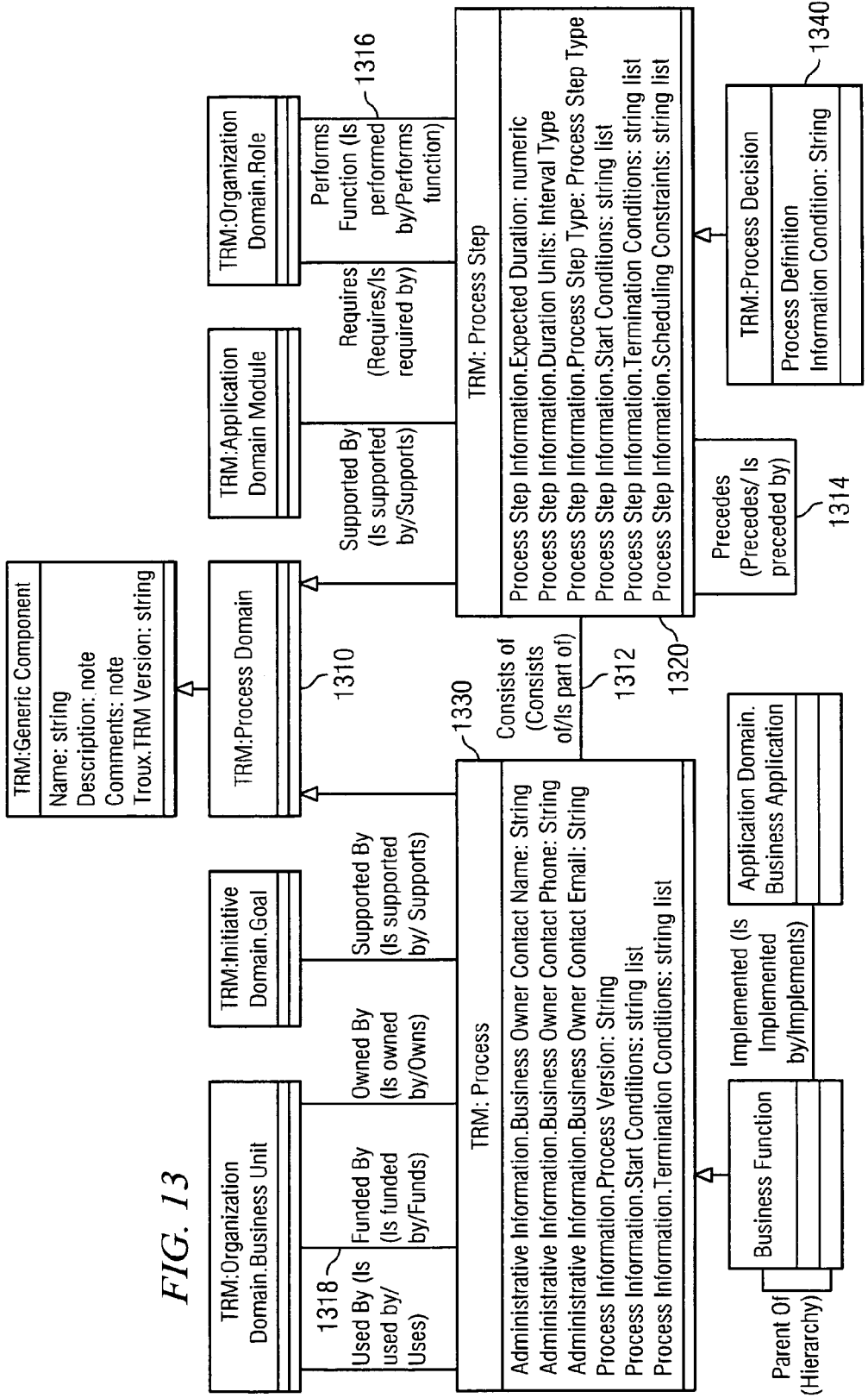

A hierarchy of component types and relationship types associated with process domain 930 is represented in FIG. 13. "Process domain" component type 1310 may be the basis for subtypes that represent business processes within enterprise architecture 990. These subtypes may include "process step" component type 1320, "process" component type 1330 and "process decision" component type 1340. Relationship types between components associated with process domain 930 include "consists of" relationship type 1312, "precedes" relationship type 1314, "requires" relationship type 1316 and "funded by" relationship type 1318.

Figure 14A:
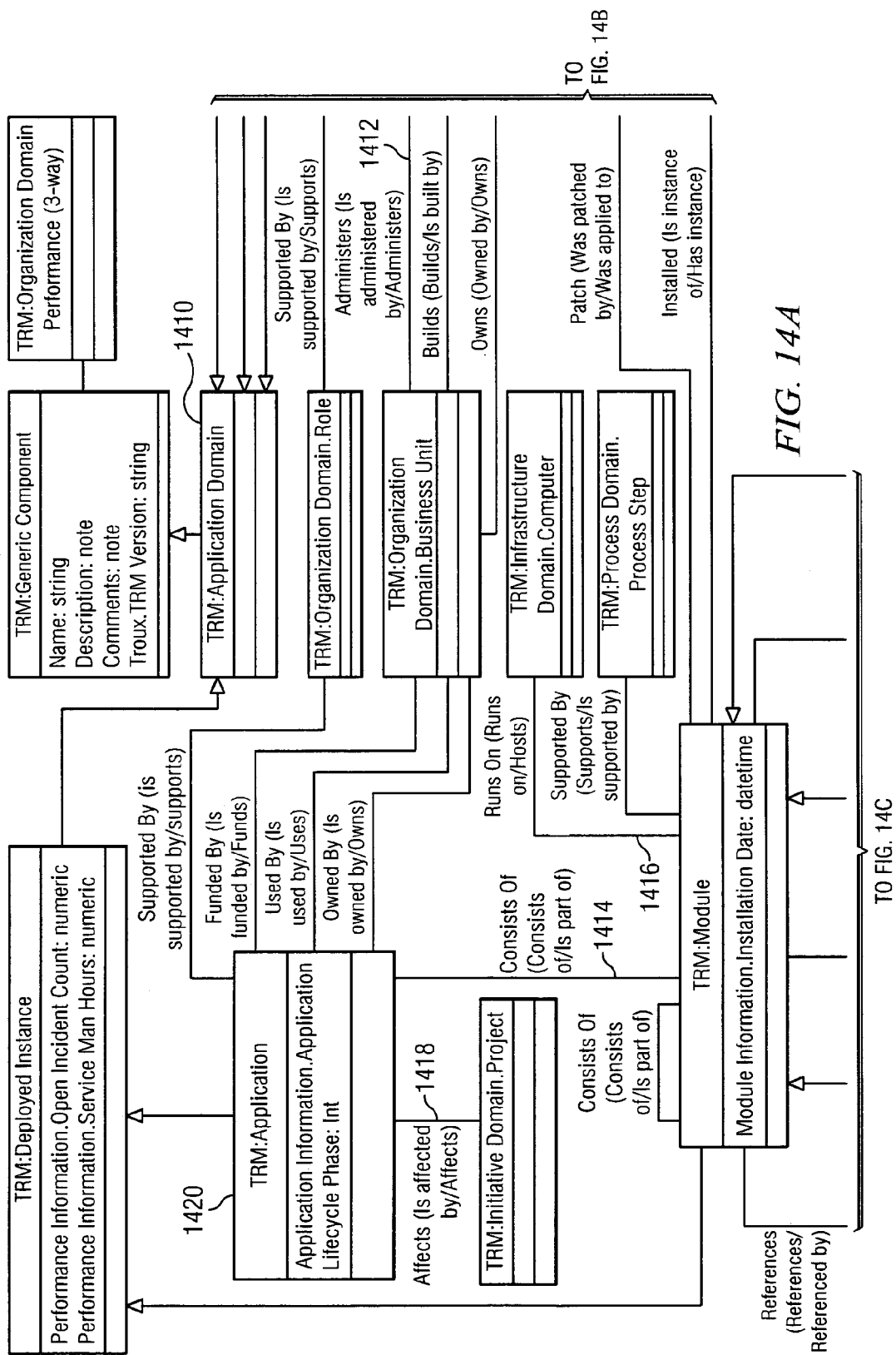
Figure 14B:
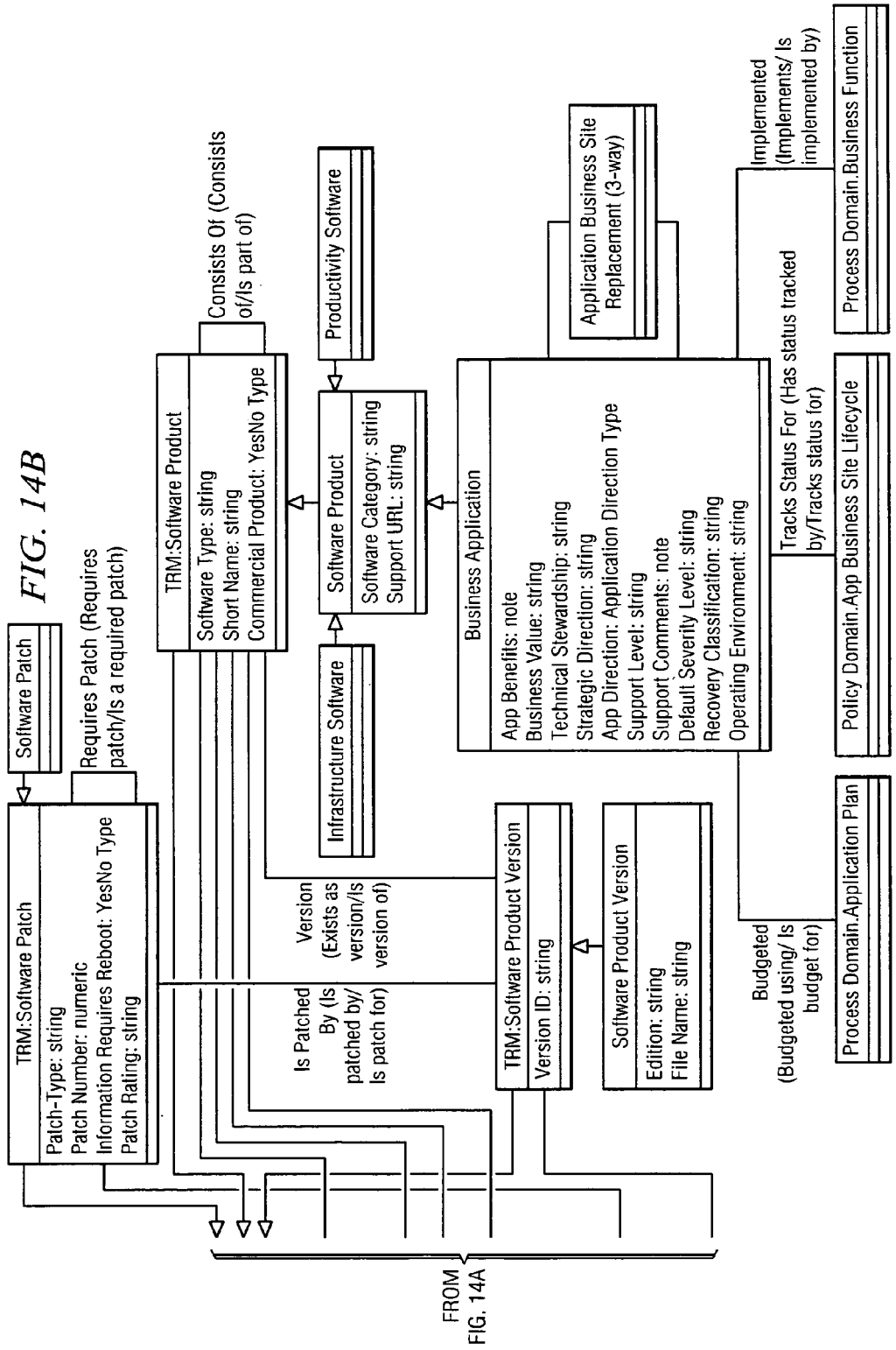
Figure 15A:
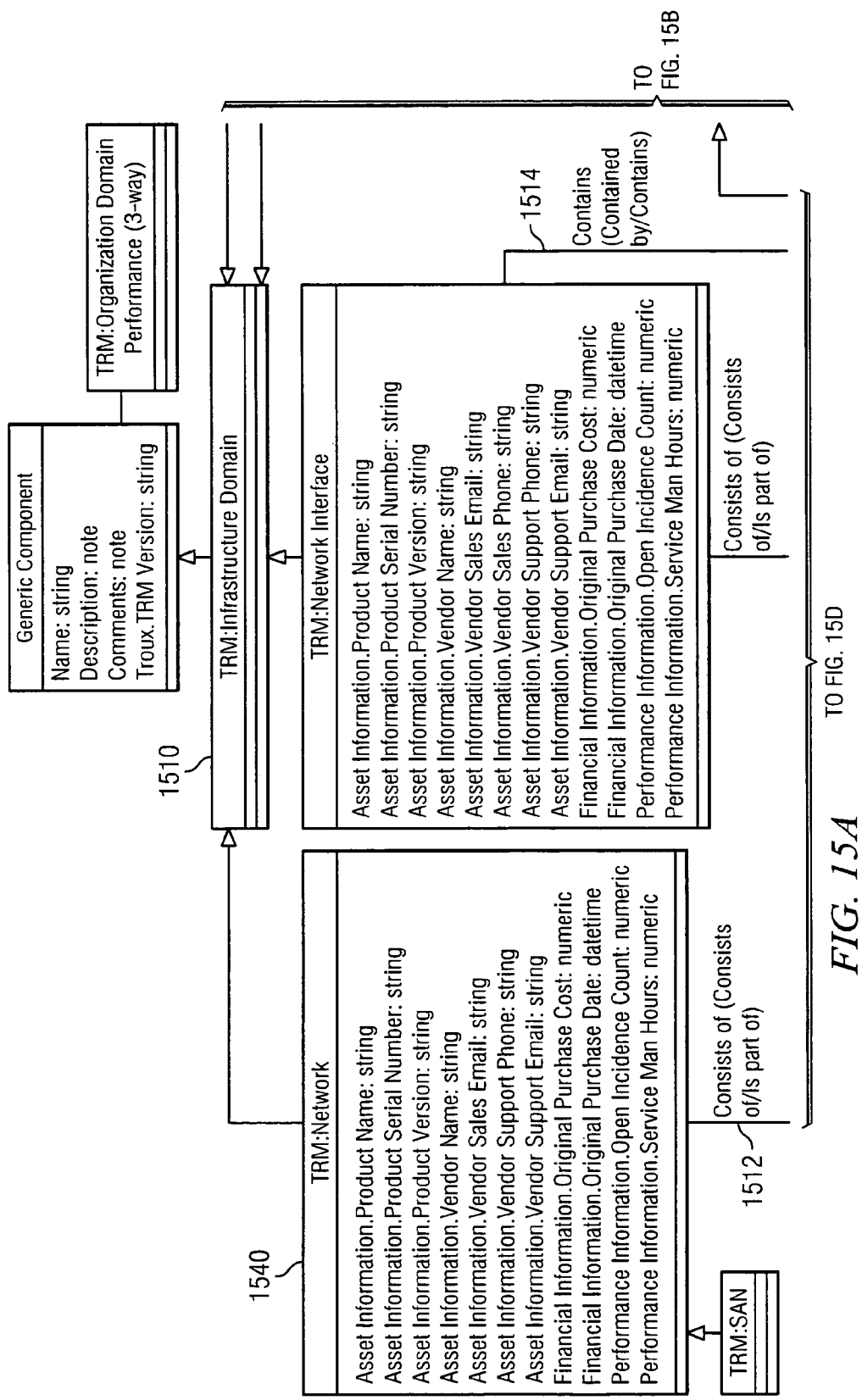
Figure 15B:
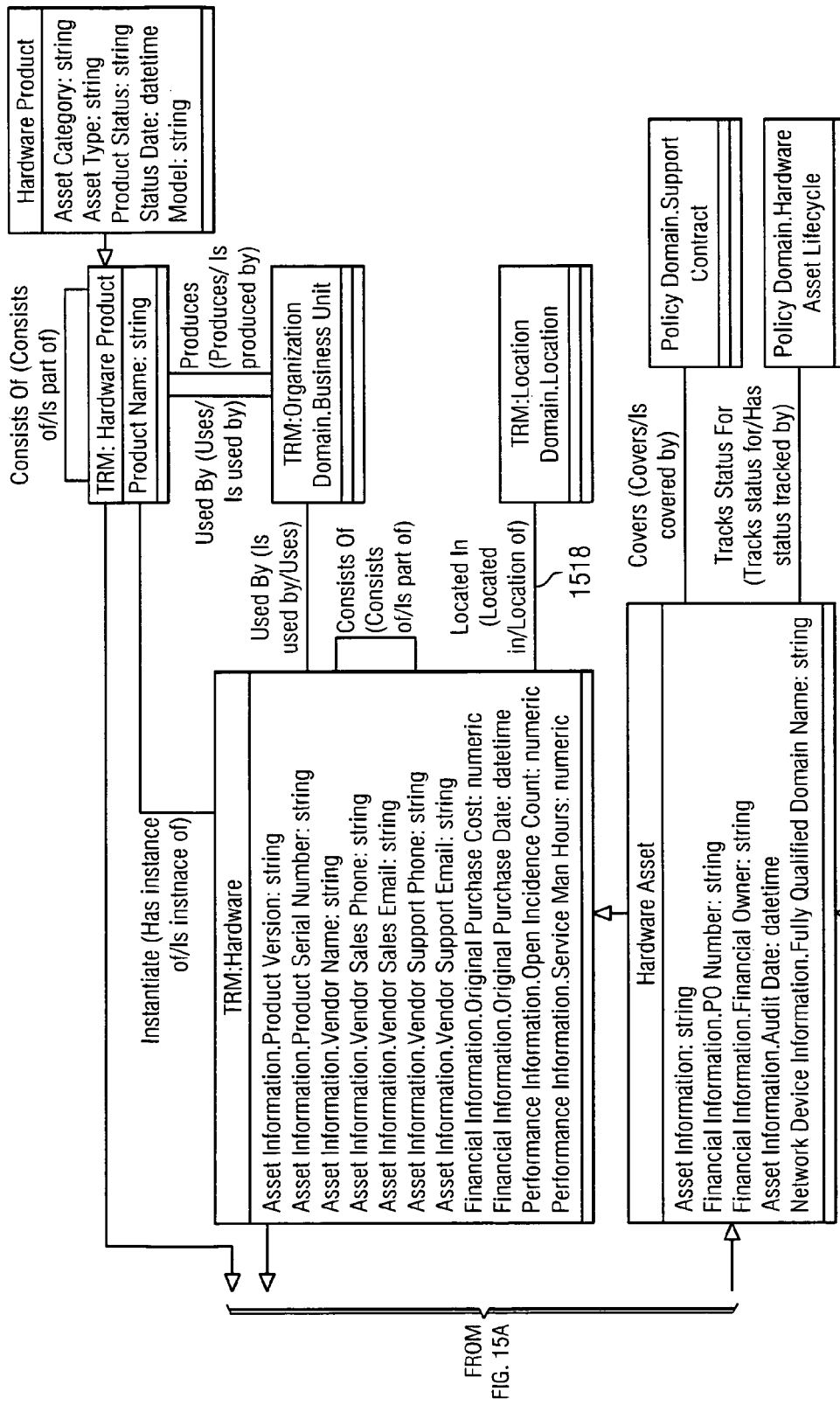
Figure 15C:
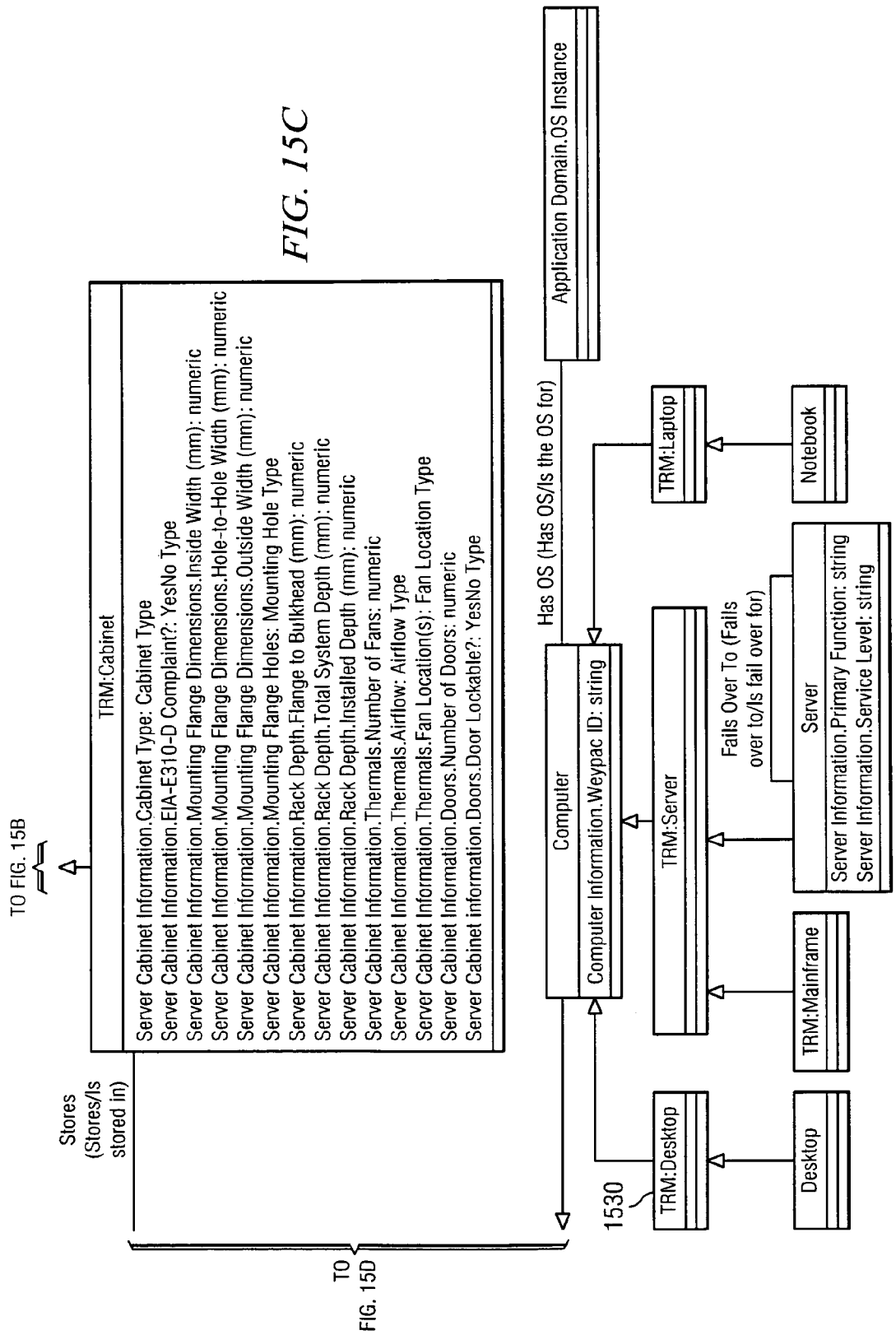
Figure 15D:
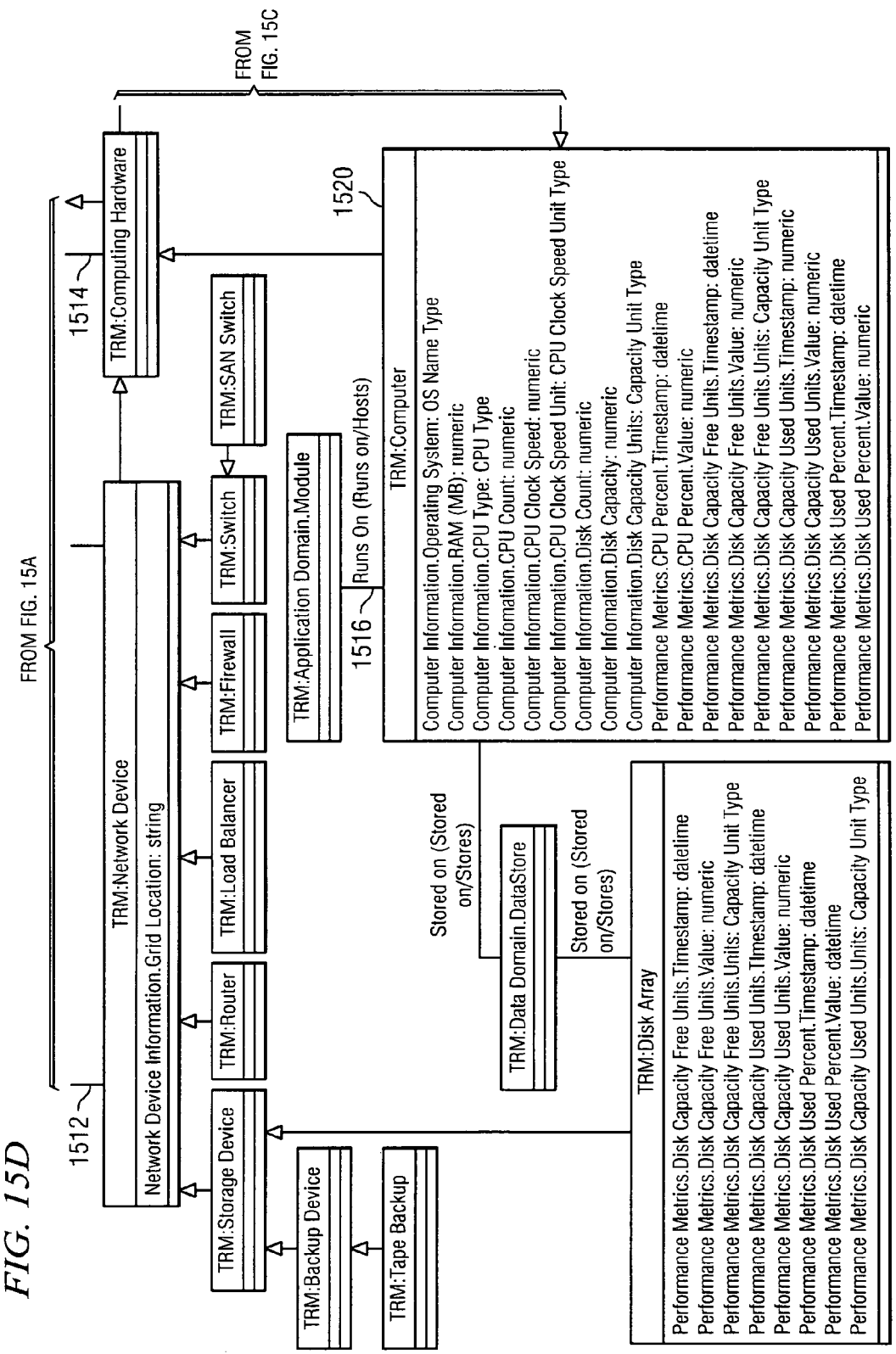

Moving on, FIG. 14 represents a hierarchy of component types and relationship types associated with application domain 940. "Application domain" component type 1410 may be the basis for subtypes that represent application or modules of an application within enterprise architecture 990. These subtypes may include "application" component type 1420, "database server" component type 1430 and "commercial module" component type 1440. Relationship types between components associated with application domain 940 include "administers" relationship type 1412, "consists of" relationship type 1414, "runs on" relationship type 1416 and "affects" relationship type 1418.

FIG. 15 represents a hierarchy of component types and relationship types associated with infrastructure domain 950. "Infrastructure domain" component type 1510 may be the basis for subtypes that represent portions of an information technology environment within enterprise architecture 990 which is dedicated to infrastructure assets, such as physical hardware. These subtypes may include "computer" component type 1520, "desktop" component type 1530 and "network" component type 1540. Relationship types between component types associated with infrastructure domain 950 include "consists of" relationship type 1512, "contains" relationship type 1514, "runs on" relationship type 1516 and "located in" relationship type 1518.

Figure 16:
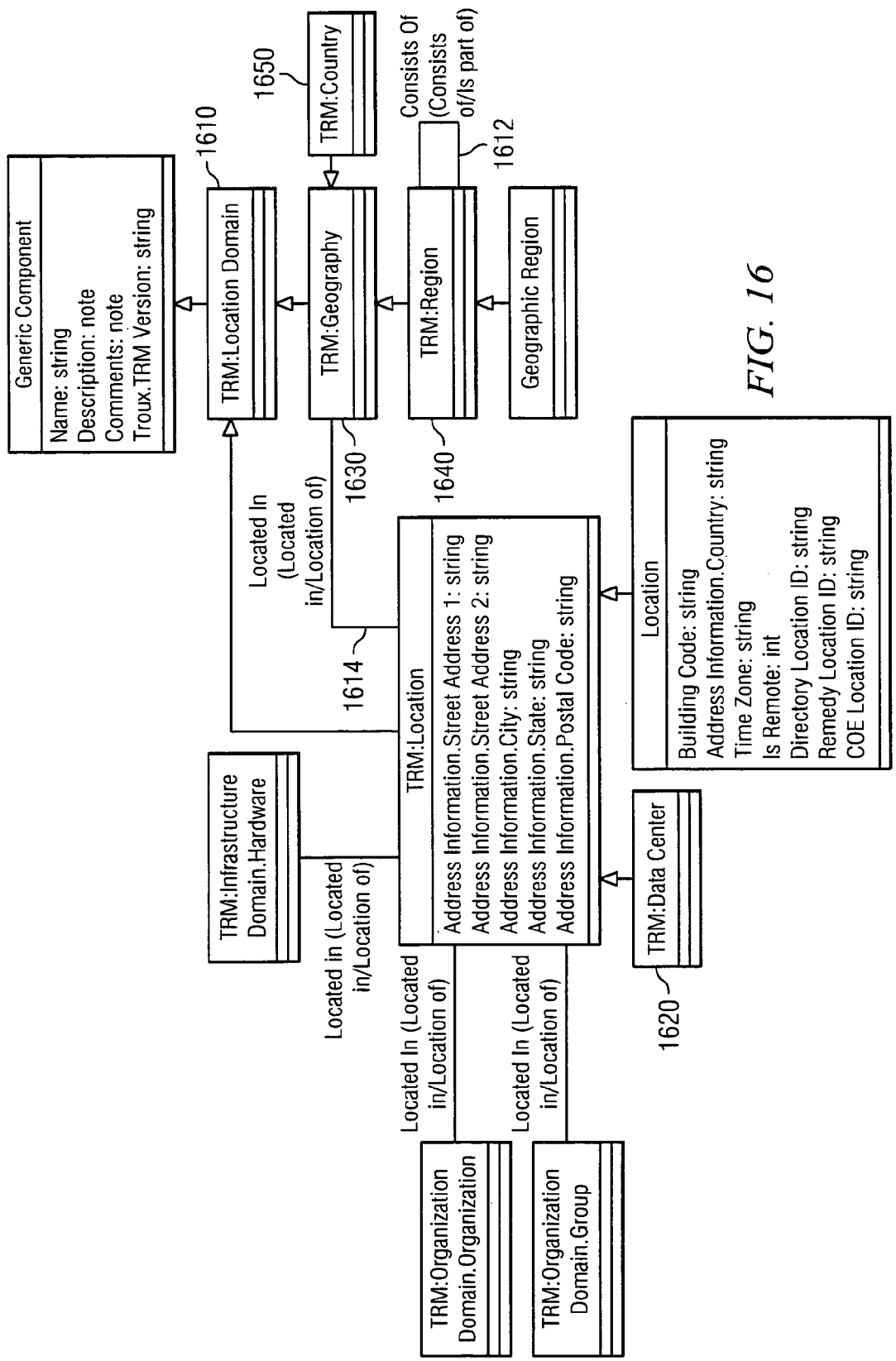
Figure 17A:
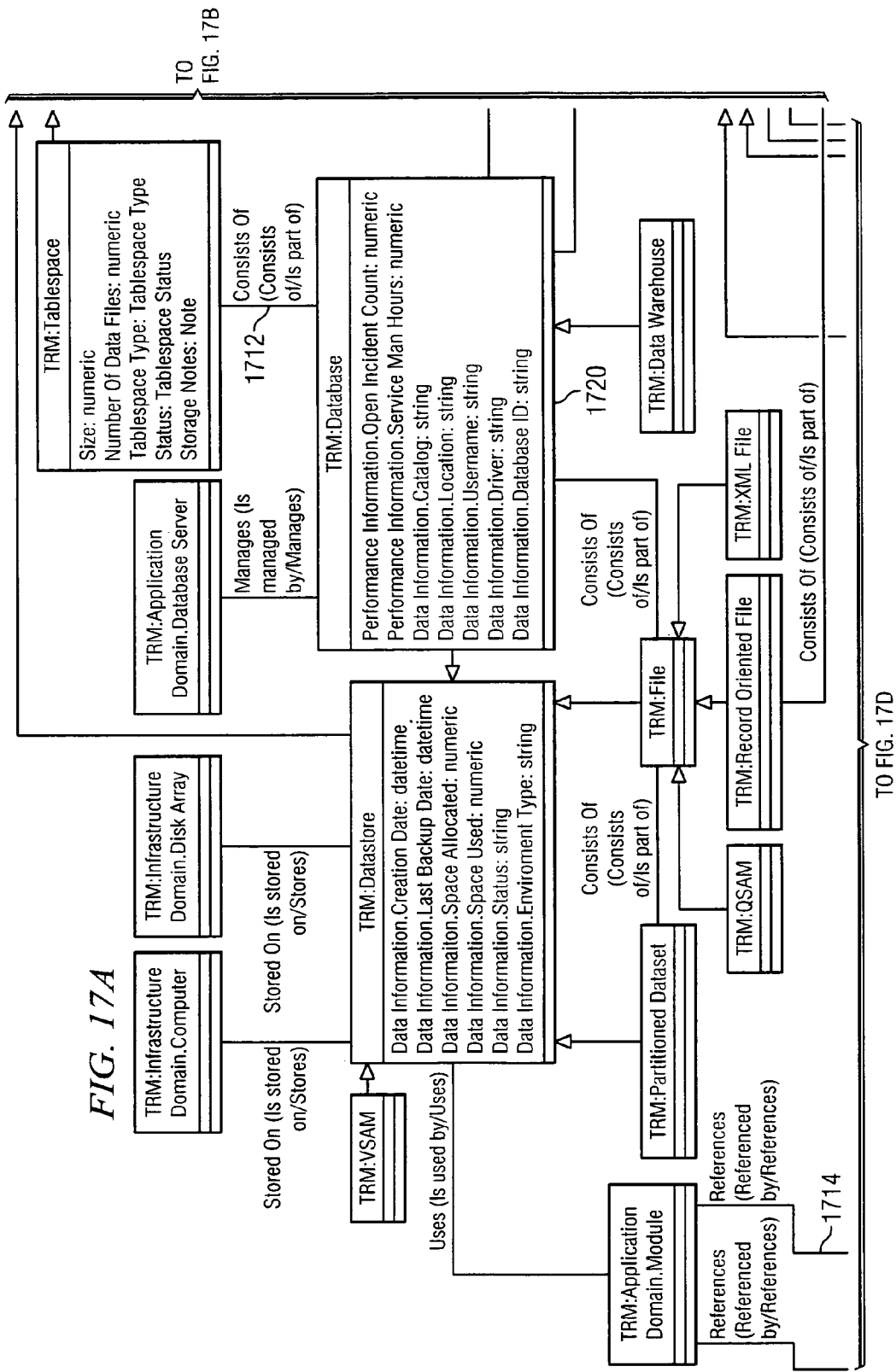
Figure 17B:
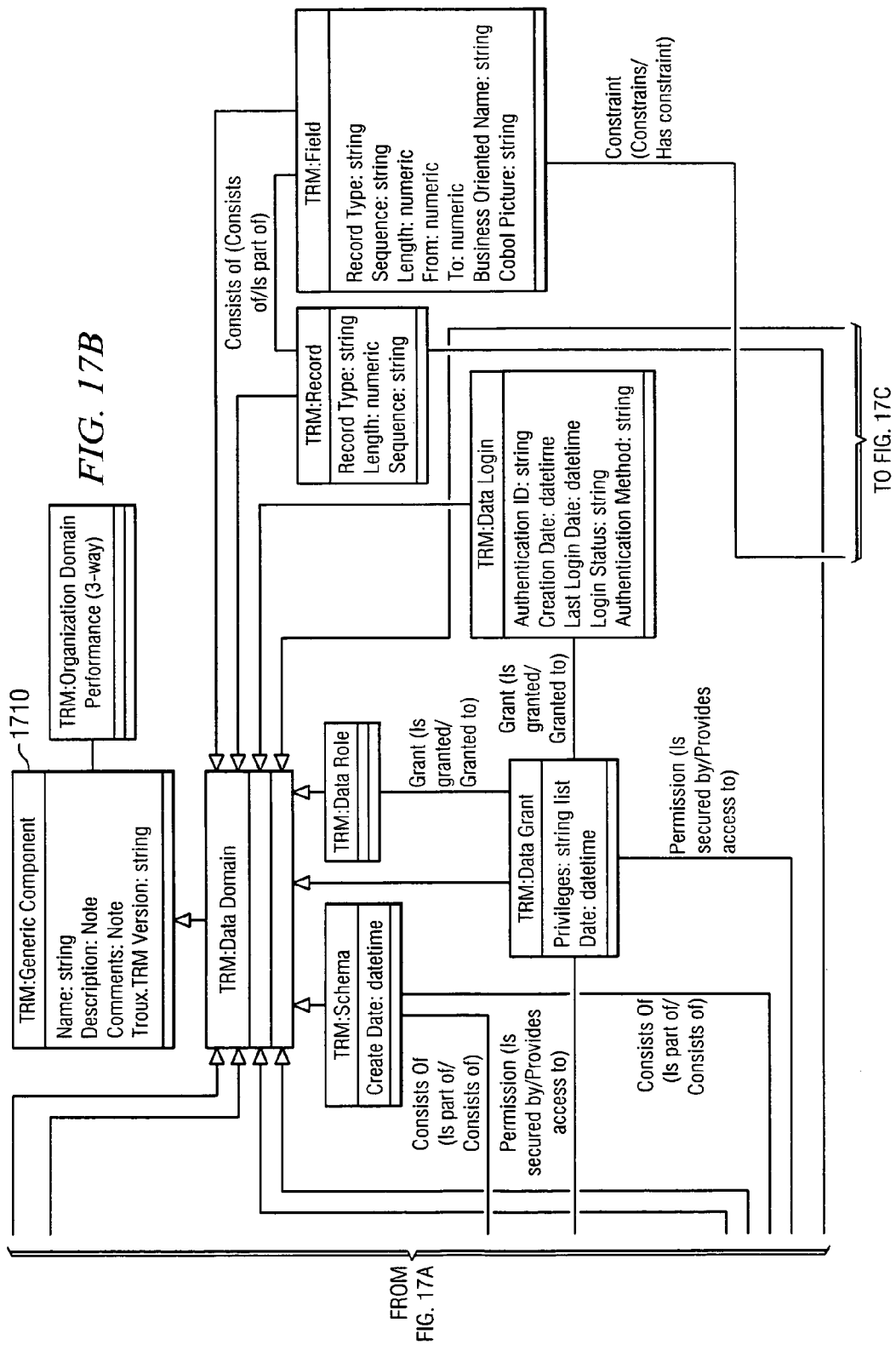
Figure 17C:
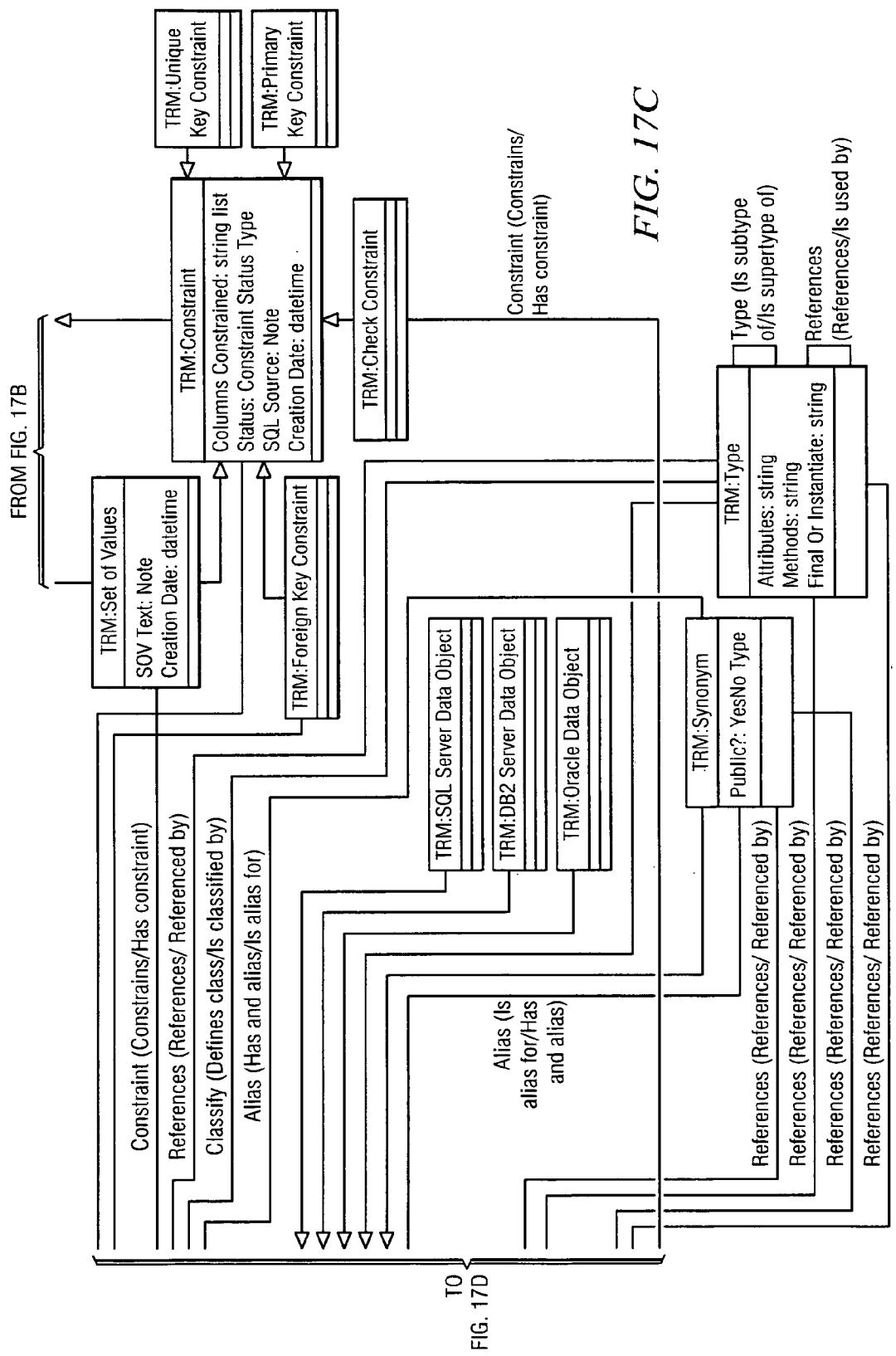
Figure 17D:
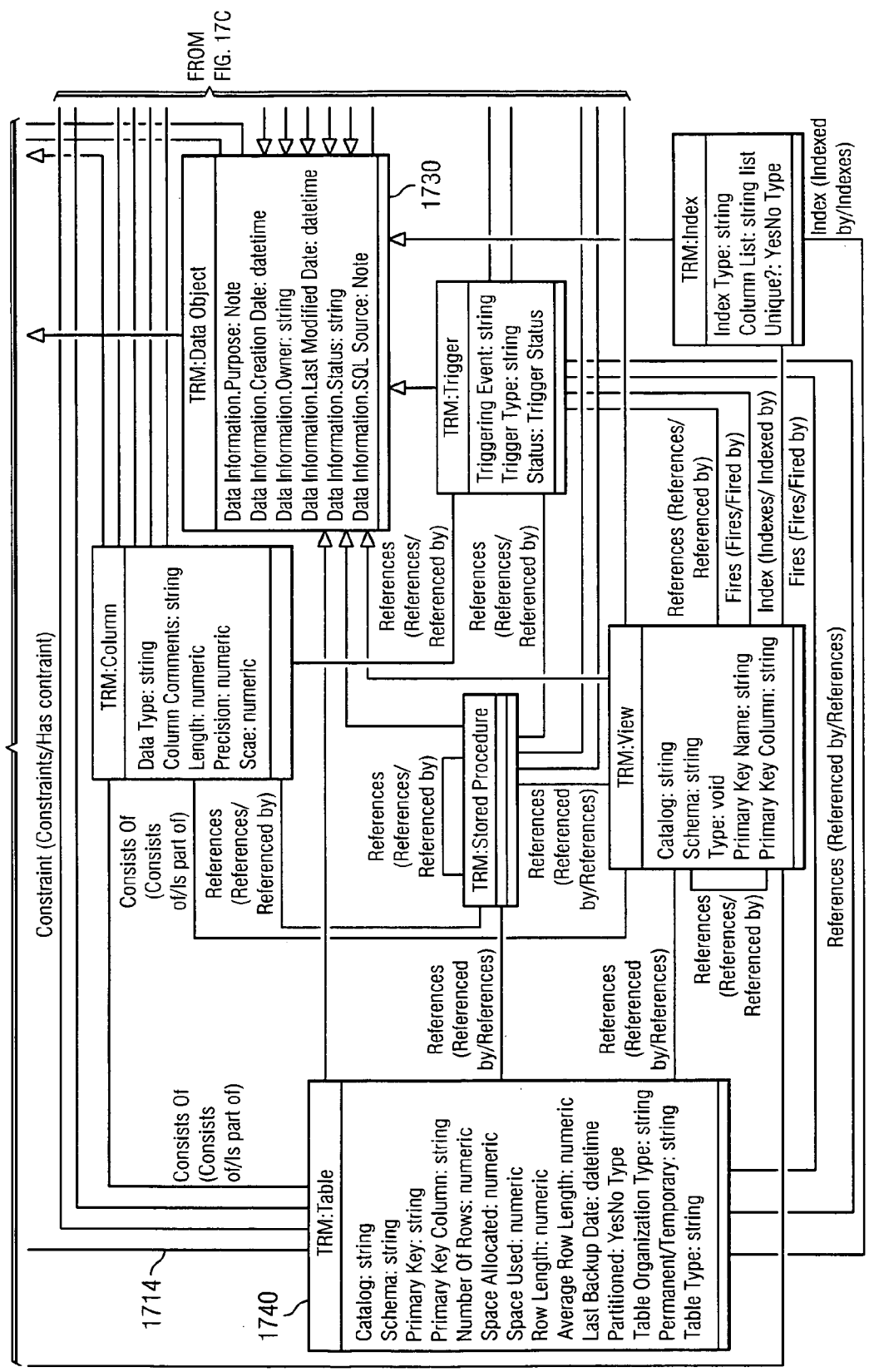

Looking now at FIG. 16, a hierarchy of component types and relationship types associated with location domain 960 is represented. "Location domain" component type 1610 may be the basis for subtypes that represent locations of various information technology entities within enterprise architecture 990. These component subtypes may include "data center" component type 1620, "geography" component type 1630, region" component type 1640 and "country" component type 1650. Relationship types between component types associated with infrastructure domain 960 include "consists of" relationship type 1612 and "located in" relationship type 1614.

FIG. 17 represents a hierarchy of component types and relationship types associated with data domain 970. "Data domain" component type 1710 may be the basis for subtypes that represent information assets within an enterprise. These component subtypes may include "data base" component type 1720, "data object" component type 1730 and "table" component type 1740. Relationship types between component types associated with data domain 970 include "consists of" relationship type 1712 and "references" relationship type 1714.

Figure 18:
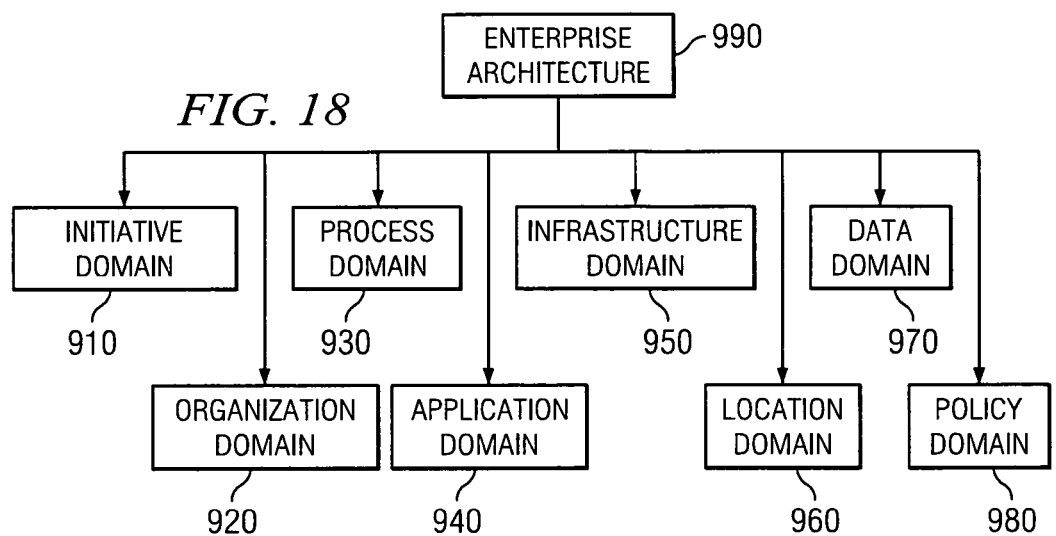
FIG. 18 includes a representation of one embodiment of group of domains for use with an enterprise architecture.

It is important to note that a reference model of the type depicted in FIGS. 10-17 is almost infinitely extensible. Suppose, for instance, that after further analysis of enterprise architecture 990 it is determined that it is desirable to model the management structure of enterprise architecture 990. FIG. 18 represents a high level view of one embodiment of a group of domains 910-980 which may encompasses the management structure of enterprise architecture 990 and may consequently be used as a baseline to further define a reference model. These domains include domains 910-970 previously expounded upon above, and policy domain 980 intended to encompass a management structure of enterprise architecture 990.

Figure 19:
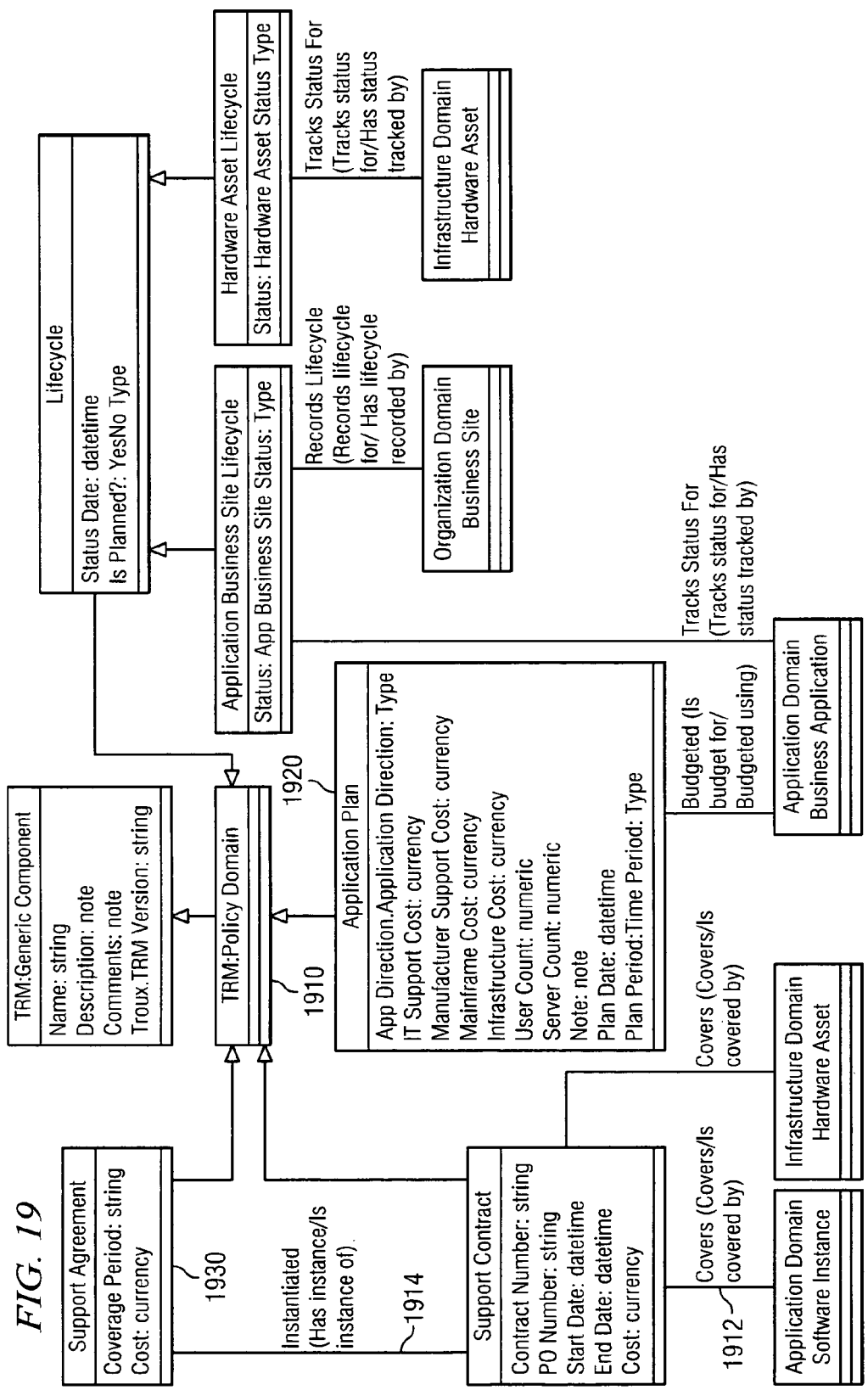
FIG. 19 includes a representation of one possible hierarchy of component types and relationship types associated with one particular domain.

An embodiment of a hierarchy of component types and relationship types that may be associated with policy domain 980 is represented in FIG. 19. "Policy domain" component type 1910 may be the basis for subtypes that represent the plans, principles, obligations, agreements, contracts and requirements which guide the management of enterprise architecture 990. These component subtypes may include "application plan" component type 1920 and "support agreement" component type 1930. Relationship types between component types associated with policy domain 980 include "covers" relationship type 1912 and "instantiated" relationship type 1914. In this manner, the management structure of enterprise architecture 990 may now be accommodated when creating a data model of an enterprise environment using a reference data model.

Note that not all of the domains, components, component types, relationships, relationship types, properties, or property types are necessary, that domains, components, component types, relationships, relationship types, properties, or property types may be added in addition to those illustrated. Additionally, the order in which each of the activities is listed is not necessarily the order in which they are performed. After reading this specification, a person of ordinary skill in the art will be capable of determining which domains, components, component types, relationships, relationship types, properties, or property types and orderings best suit any particular objective. For example, domains such as time and finance may be added to the domains described above.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

APPENDIX A

This Appendix depicts an exemplary embodiment of a reference model for use in modeling arbitrarily complex enterprise architectures. In this Appendix, the properties and property categories for a component type are shown in a table. Only the non-inherited properties are shown. The table looks like this:

| Name | Description | Type |
|---|---|---|
| Property Name 1 Property Category | Property Description 1 | Property Type 1 |
| Property Name 2 | Property Description 2 | Property Type 2 |

In this Appendix, relationship types are defined for each component type in a table following the property definitions. The relationship table will appear with a header as follows:

| Relationship Type | Label | Target Component Types |
|---|---|---|

The Relationship Type identifies the name of a valid relationship type.

The Label identifies the direction-sensitive phrase that describes how this component type is related to the Target Component Type. Note that the same relationship has a different Label when viewed from the Target Component Type.

The TargetComponentTypes refers to the valid destination of the relationship. Unless otherwise stated, the relationship may be associated with all subtypes of the specified Target Component Type.

In the following two tables, a relationship, of type Runs On, is declared to be valid between a Module and a Server.

Module Relationship Types

| Relationship Type | Label | Target Component Types |
|---|---|---|
| Runs On | Runs on | Server |

Server Relationship Types

| Relationship Type | Label | Target Component Types |
|---|---|---|
| Runs On | Hosts | Module |

When looking at a Server within TBS during presentation time, the user will be presented with the text:

"Server x Hosts Module y."

However, when looking at a Module during presentation time, the user will be presented with the text:

"Module y Runs On Server x."

The Reference Model

The example reference model is engineered for modeling entities found within an enterprise IT environment. 8 major domains of entities may be utilized:

Initiative Domain
Organization Domain
Process Domain
Application Domain
Infrastructure Domain
Location Domain
Data Domain
Policy Domain Collectively, these domains encompass a whole corporate IT environment. Within each domain, the TRM provides further classification by identifying a hierarchy of types, and the relationships between them.

The reference model also provides the means by which cross-domain relationships can be represented. This is arguably one of the most important aspects of the TRM. It is through these cross-domain associations that alignments between IT operational resources and strategic initiatives can be formed.

Component Types

Generic Component

The Generic Component type is an abstract component type from which all types may be derived. Each component type in the model is ultimately a descendant of this type and therefore inherits the properties defined in the Generic Component.

Generally, no component of this type should ever be created. Instead, choose one of the component types identified within one of the domains.

TABLE 1

| Generic Component Properties ||| 
|---|---|---|
| Name | Description | Type |
| Comments | These are comments that are not necessarily a part of the component's description. | Note |
| Troux ||| 
| TRM Version | This property is reserved for use by Troux. It contains the version of the TRM that created the instance of the component type. | string |

Initiative Domain

The Initiative Domain is the abstract base for component types representing the entities that describe business initiatives. The component types in this domain are used to model projects down to the task level.

TABLE 2

| Initiative Domain Properties ||| 
|---|---|---|
| Name | Description | Type |
| Administrative Information ||| 
| Business Owner Contact Name | The primary business contact's name. | string |
| Business Owner Contact Phone | This property describes the primary business contact's phone. | string |
| Business Owner Contact Email | The primary business contact's email address. | string |

Goal

Goal is a subtype of Initiative Domain.

This component type describes a goal or an objective.

TABLE 3

Goal Properties

| Name | Description | Type |
|---|---|---|
| *Goal Information* | | |
| Target Date of Completion | The date that this goal is expected to be completed. | datetime |
| Risks of Targeting the Goal | A list of business risks associated with pursuing this business goal. | string list |
| Risks of Not Targeting the Goal | A list of business risks associated with not pursuing this business goal. | string list |

TABLE 4

Goal Relationship Types

| Relationship Type | Label | Target Component Types |
|---|---|---|
| Supported By | Is supported by | Process |
| Supported By | Is supported by | Project |

Project

Project is a subtype of Initiative Domain.

The Project component type is used to represent a project.

TABLE 5

Project Properties

| Name | Description | Type |
|---|---|---|
| *Project Information* | | |
| Start Date | The projected start date of this project. | datetime |
| Finish Date | The projected finish date of this project. | datetime |
| Actual Start Date | The day this project actually started. | datetime |
| Actual Finish Date | The day this project actually finished. | datetime |
| Project Status | The current status of this project. | Project Phase Type |

TABLE 6

Project Relationship Types

| Relationship Type | Label | Target Component Types |
|---|---|---|
| Supported By | Supports | Goal |
| Affects | Affects | Application |
| Consists Of | Consists Of | Task |

Task

Task is a subtype of Initiative Domain.

Describes an element of work that is part of a Project.

TABLE 7

Task Properties

| Name | Description | Type |
|---|---|---|
| *Task Information* | | |
| Start Date | Starting date for this task. | datetime |
| Finish Date | The projected finish date for this task. | datetime |

TABLE 7-continued

Task Properties

| Name | Description | Type |
|---|---|---|
| Actual Start Date | The actual start date for this task. | datetime |
| Actual Finish Date | The actual finish date for this task. | datetime |
| Milestone? | Indicates whether the completion of this task marks a major milestone in the project. | YesNo Type |
| Percent Complete | The completion percentage of this task. | numeric |
| Resources | A list of people that are assigned to this task. | string list |
| Status | The current status of this task. | Task Status Type |

TABLE 8

Task Relationship Types

| Relationship Type | Label | Target Component Type |
|---|---|---|
| Consists Of | Is part of | Project |

Organization Domain

The Organization Domain is the abstract base for component types representing the entities that describe the people and organizations that a business is constructed of.

Enterprise

Enterprise is a subtype of Organization Domain.

An Enterprise is comprised of all the establishments that operate under the ownership or control of a single organization.

TABLE 9

Enterprise Properties

| Name | Decription | Type |
|---|---|---|
| *Administrative Information* | | |
| URL | URL of the enterprise | string |
| Notes | Description of the Enterprise and other notes | Note |

Manufacturer

Manufacturer is a subtype of Enterprise.

A Manufacturer is an organization that produces and supports software and or hardware products.

TABLE 10

Business Unit Relationship Types

| Relationship Type | Label | Target Component Types |
|---|---|---|
| Produces | produces | Hardware Product |
| Builds | Builds | Software Product |
| Represents | Is represented by | Person |

Business Unit

Business Unit is a subtype of Organization Domain.

A Business Unit describes a business area or organization within a larger corporate entity.

TABLE 11

Business Unit Properties

| Name | Description | Type |
|---|---|---|
| Administrative Information | | |
| Business Owner Contact Name | The primary business contact's name. | string |
| Business Owner Contact Phone | This property describes the primary business contact's phone. | string |
| Business Owner Contact Email | The primary business contact's email address. | string |

TABLE 12

Business Unit Relationship Types

| Relationship Type | Label | Target Component Types |
|---|---|---|
| Consists Of | Consists Of | Group |
| Used By | Uses | Application |
| Used By | Uses | Process |
| Used By | Uses | Hardware Product |
| Used By | Uses | Hardware |
| Funded By | Funds | Application |
| Funded By | Funds | Process |
| Owned By | Owns | Application |
| Owned By | Owns | Process |
| Supported by | Is supported by | Role |
| Administers | Administers | Software Product |
| Owned By | Owns | Software Product |
| Consists Of | Consists Of | Business Unit |
| Located In | Located in | Location |

Group

Group is a subtype of Organization Domain.

The Group component type is used to represent a group of people.

TABLE 13

Group Relationship Types

| Relationship Type | Label | Target Component Types |
|---|---|---|
| Consists Of | Is part of | Business Unit |
| Member Of | Is a member of | Group |
| Member Of | Has member | Group |
| Performed By | Performs | Role |
| Supported by | Is supported by | Role |
| Located In | Located in | Location |

Person

Person is a subtype of Group. That is, a person is a group of one.

Use this component type to represent a person.

TABLE 14

Person Properties

| Name | Description | Type |
|---|---|---|
| Person Information | | |
| Estimated Annualized Compensation | Estimated annualized compensation for this person in U.S. dollars. | numeric |
| Start Date | The date this person started working for the company. | datetime |

TABLE 14-continued

Person Properties

| Name | Description | Type |
|---|---|---|
| Status | The person's current employment status. | Employee Status Type |
| Title | The person's business title. | string |
| Username | Name used for logon | string |

TABLE 15

Person Relationship Types

| Relationship Type | Label | Target Component Types |
|---|---|---|
| Possesses | Possesses | Skill |
| Represents | Represents | Manufacturer |

Privilege

Privilege is a subtype of Organization Domain.

The Privilege component type is used to describe a particular authorization given to a person.

TABLE 16

Privilege Relationship Types

| Relationship Type | Label | Target Component Types |
|---|---|---|
| Granted | Granted to | Role |

Role

Role is a subtype of Organization Domain.

The Role component type is used to describe a particular set of responsibilities, privileges, or functions assigned to a person.

TABLE 17

Role Relationship Types

| Relationship Type | Label | Target Component Types |
|---|---|---|
| Granted | Is Granted | Privilege |
| Performed By | Is performed by | Group |
| Requires | Is required by | Process Step |
| Supported by | supports | Application |
| Supported by | supports | Business Unit |
| Supported by | Supports | Software Product |
| Supported by | supports | Group |
| Performs Function | Performs function | Process Step |

Skill

Skill is a subtype of Organization Domain.

The Skill component type is used to describe a particular ability possessed by a person.

TABLE 18

Skill Relationship Types

| Relationship Type | Label | Target Component Types |
|---|---|---|
| Possesses | Is possessed by | Person |

Process Domain

The Process Domain is the abstract base for component types representing the entities that can be used to represent business processes.

Process

Process is a subtype of Process Domain.

This component type is used to represent processes.

TABLE 19

Process Properties

| Name | Description | Type |
|---|---|---|
| Administrative Information | | |
| Business Owner Contact Name | This property describes the primary business contact's name for this component. | string |
| Business Owner Contact Phone | This property describes the primary business contact's phone number for this component. | string |
| Business Owner Contact Email | This property describes the primary business contact's email address for this component. | string |
| Process Information | | |
| Process Version | The current version of this process. | string |
| Start Conditions | A list of conditions that must be met before this process can begin. | string list |
| Termination Conditions | A list of conditions that must be met before this process can end. | string list |

TABLE 20

Process Relationship Types

| Relationship Type | Label | Target Component Types |
|---|---|---|
| Supported By | Supports | Goal |
| Funded By | Is funded by | Business Unit |
| Owned By | Is owned by | Business Unit |
| Used By | Is used by | Business Unit |
| Consists Of | Consists of | Process Step |

Process Step

Process Step is a subtype of Process Domain.

A Process Step component type is used to represent a step in a process.

TABLE 21

Process Step Properties

| Name | Description | Type |
|---|---|---|
| Process Step Information | | |
| Expected Duration | The time this process step is expected to take to complete. | numeric |
| Duration Units | Days, weeks, or minutes of duration. | Interval Type |
| Process Step Type | The type of process step. (manual or automated). | Process Step Type |
| Start Conditions | A list of conditions that must be met before this step can begin. | string list |
| Termination Conditions | A list of conditions that must be met before this step can end. | string list |
| Scheduling Constraints | A list of scheduling constraints that must be adhered to while this step is underway. For example, the step can only be worked on during normal business hours. | string list |

TABLE 22

Process Step Relationship Types

| Relationship Type | Label | Target Component Types |
|---|---|---|
| Performs Function | Is performed by | Role |
| Precedes | Precedes | Process Step |
| Precedes | Is preceded by | Process Step |
| Requires Supported By | Requires Is supported by | Role Module |
| Consists Of | Is part of | Process |
| Consists of | Is part of | Process Step |

Process Decision

Process Decision is a subtype of Process Step.

A Process Decision component type is used to represent a condition for determining the next action in a process.

TABLE 23

Process Decision Properties

| Name | Description | Type |
|---|---|---|
| Process Decision Information | | |
| Condition | A condition for determining the next action in a process. | string |

Application Domain

The Application Domain is the abstract base type for component types representing the entities that are used to classify software assets.

Deployed Instance

Deployed Instance is a subtype of Application Domain.

Deployed Instance is an abstract base type for types that are deployed (e.g. installed software).

TABLE 24

Deployed Instance Properties

| Name | Description | Type |
|---|---|---|
| *Performance Information* | | |
| Open Incident Count | The number of incidents currently open for this component. | numeric |
| Service Man Hours | The number of service man-hours currently logged against this component. | numeric |

Application

Application is a subtype of Deployed Instance.

Application is a logical grouping of one or more instances of executable software that fulfill a set of requirements.

TABLE 25

Application Properties

| Name | Description | Type |
|---|---|---|
| *Application Information* | | |
| Application Lifecycle Phase | The current lifecycle phase of this component. | Application Lifecycle Phase Type |

TABLE 26

Application Relationship Types

| Relationship Type | Label | Target Component Types |
|---|---|---|
| Affects | Is affected by | Project |
| Consists Of | Consists of | Module |
| Funded By | Is funded by | Business Unit |
| Owned By | Is owned by | Business Unit |
| Used By | Is used by | Business Unit |
| Supported by | Is supported by | Role |

Database

Database is a subtype of Deployed Instance.

A Database component type is used to represent a physical data store that serves one or more applications. This subtype has been deprecated.

TABLE 27

Database Relationship Types

| Relationship Type | Label | Target Component Types |
|---|---|---|
| Stored On | Is stored on | Disk Array |
| Stored On | Is stored on | Server |
| Manages | Is managed by | Database Server |
| Uses | Is used by | Module |

Data Warehouse

Data Warehouse is a subtype of Database.

The Data Warehouse component type is used to represent the physical data store used as a Data Warehouse. This subtype has been deprecated.

Module

Module is a subtype of Deployed Instance.

A Module component type is used to describe an instance of installed software that implements single or multiple functional capabilities.

TABLE 28

Module Properties

| Name | Description | Type |
|---|---|---|
| *Module Information* | | |
| Installation Date | The installation date of this component. | datetime |

TABLE 29

Module Relationship Types

| Relationship Type | Label | Target Component Types |
|---|---|---|
| Consists Of | Is part of | Application |
| Consists Of | Is part of | Module |
| Consists Of | Consists of | Module |
| Runs On | Runs on | Computer |
| Supported By | Supports | Process Step |
| Uses | Uses | Database |
| Installed | Is instance of | Software Product Version |
| Patch | Was patched by | Software Patch |

Commercial Module

Commercial Module is a subtype of Module.

A Commercial Module component type is used to describe an instance of an installed commercial software

TABLE 30

Commercial Module Properties

| Name | Description | Type |
|---|---|---|
| *Financial Information* | | |
| Original Purchase Date | The date this component was purchased. | datetime |
| *Asset Information* | | |
| Product Name | The vendor or internal name of this product. | string |
| Product Version | The product version of this component. | string |
| Product Patch Level | The product patch level of this component. | string |
| Product Serial Number | The product serial number of this component. | string |
| Vendor Name | The name of the vendor supplying this module. | string |
| Vendor Sales Phone | The phone number of the vendor supplying this module. | string |
| Vendor Sales Email | The email address of the vendor supplying this module. | string |
| Vendor Support Phone | The vendor's support phone number for this module. | string |
| Vendor Support Email | The vendor's support email address for this module. | string |

Software Server

Commercial Software Server is a subtype of Commercial Module.

A Commercial Software Server component type is used to describe a network-addressable module that runs on a physical server. Various subtypes of software servers include database servers, application servers, web servers, etc.

Application Server

Application Server is a subtype of Software Server.

The Application Server component type is used to represent the Application Server class of Software Servers. Examples of Application Servers include WebLogic and WebSphere.

Web Server

Web Server is a subtype of Software Server.

The Web Server component type is used to represent the Web Server class of Software Servers. Examples of Web Servers include IIS and Apache.

File Server

File Server is a subtype of Software Server.

The File Server component type is used to represent the File Server class of Software Servers.

Database Server

Database Server is a subtype of Software Server.

The Database Server component type is used to represent the Database Server class of Software Servers. Examples of Database Servers include Oracle and Microsoft SQL Server.

TABLE 31

Database Server Relationship Types

| Relationship Type | Label | Target Component Types |
|---|---|---|
| Manages | Manages | Database |

Custom Module

Custom Module is a subtype of Module.

A Custom Module component type is used to describe an instance of a custom written software-based component that is used as a part of an Application.

Software Product

Software Product is a subtype of Application Domain.

It describes a particular kind of software (e.g. a software product) that is either offered commercially or custom developed. This subtype is not intended to represent a particular deployment of the software product, but rather represents the product in general as a class (e.g. Microsoft produces Word where Word is an instance of the type Software Product.)

TABLE 32

Software Product Properties

| Name | Description | Type |
|---|---|---|
| Application Information | | |
| Software Type | The type of software | string |
| Short name | A short name of product | string |
| Description | Description of software product | note |
| Commercial product | Is this a commercial product? | Yes/no |

TABLE 33

Software Product Relationship Types

| Relationship Type | Label | Target Component Types |
|---|---|---|
| Supported by | Is supported by | Role |
| Version | Exists as version | Software Product Version |
| Build | Is built by | Manufacturer |
| Consists of | Consists of | Software Product |
| Consists of | Is part of | Software Product |
| Administers | Is administered by | Business Unit |
| Owned By | Owned by | Business Unit |

Software Product Version

Software Product Version is a subtype of Application Domain.

A Software Product Version represents a particular version of a kind of Software Product (e.g. a version of a software product) that is either offered commercially or custom developed. This subtype is not intended to represent a particular deployment of the software product, but rather represents the product version in general as a class (e.g. Microsoft produces Word 2000 where Word 2000 is an instance of the type Software Product Version.)

TABLE 34

Software Product Version Properties

| Name | Description | Type |
|---|---|---|
| Software Product Information | | |
| Version number | Version number | String |
| Version name | Version name | String |
| Version description | Description of version | Note |

TABLE 35

Software Product Version Relationship Types

| Relationship Type | Label | Target Component Types |
|---|---|---|
| Version | Is version of | Software Product |
| Is patched by | Is patched by | Software Patch |
| Installed | Has instance | Module |

Software Patch

Software Patch is a subtype of Application Domain.

It describes a modification to software that corrects an error or weakness. This subtype is not intended to represent a specific deployment of the software patch,

TABLE 36

Software Patch Properties

| Name | Description | Type |
|---|---|---|
| Software Batch Information | | |
| Patch-Type | The type of patch | string |
| Patch Name | The name of the patch | string |
| Patch Number | The number of the patch | numeric |

TABLE 36-continued

Software Patch Properties

| Name | Description | Type |
|---|---|---|
| Patch Description | Text description of patch | Note |
| Requires Reboot | Identifies if reboot is required | YesNo |
| Patch Rating | Vendor rating of patch | string |

TABLE 37

Software Patch Relationship Types

| Relationship Type | Label | Target Component Types |
|---|---|---|
| Requires Patch | Requires Patch | Software Patch |
| Patch | Was applied to | Module |
| Requires Patch | Is a required patch | Software Patch |
| Is Patched by | Is Patch for | Software Product Version |

Infrastructure Domain

The Infrastructure Domain is the abstract base type for component types representing the portion of the IT environment dedicated to infrastructure assets such as physical hardware.

Hardware Product

Hardware Product is a subtype of the Hardware Domain.

Hardware Product describes a particular kind of hardware that is either offered commercially or custom developed. This subtype is not intended to represent a particular deployment of the hardware product, but rather represents the product as a class (e.g. Dell produces the Latitude C600 where Latitude C600 is an instance of the subtype Hardware Product.)

TABLE 38

Hardware Product Properties

| Name | Description | Type |
|---|---|---|
| Asset Information | | |
| Product Name | The vendor or internal name of this product. | string |

TABLE 39

Hardware Product Relationship Types

| Relationship Type | Label | Target Component Types |
|---|---|---|
| Used By | Is used by | Business Unit |
| Instantiate | Has instance of | Hardware |
| Produces | Is produced by | Manufacturer |

Hardware

Hardware is a subtype of Infrastructure Domain.

The Hardware Subtype represents the physical deployed instance of a hardware product.

TABLE 40

Infrastructure Domain Properties

| Name | Description | Type |
|---|---|---|
| Asset Information | | |
| Product Name | The vendor or internal name of this product. | string |
| Product Version | The product version of this component. | string |
| Product Serial Number | The product serial number of this component. | string |
| Vendor Name | The name of the vendor supplying this module. | string |
| Vendor Sales Phone | The phone number of the vendor supplying this module. | string |
| Vendor Sales Email | The email address of the vendor supplying this module. | string |
| Vendor Support Phone | The vendor's support phone number of this module. | string |
| Vendor Support Email | The vendor's support email address of for this module. | string |
| Financial Information | | |
| Original Purchase Cost | The original purchase price of this component. | numeric |
| Original Purchase Date | The original purchase date of this component. | datetime |
| Performance Information | | |
| Open Incident Count | The number of incidents currently open for this component. | numeric |
| Service Man Hours | The number of service man-hours currently logged against this component. | numeric |

TABLE 41

Hardware Relationship Types

| Relationship Type | Label | Target Component Types |
|---|---|---|
| Used By | Is used by | Business Unit |
| Instantiate | Is instance of | Hardware Product |
| Consists of | Consists of | Hardware |

Cabinet

Cabinet is a subtype of Hardware.

Use the Cabinet component type to represent server cabinets.

TABLE 42

Cabinet Properties

| Name | Description | Type |
|---|---|---|
| Server Cabinet Information | | |
| Cabinet Type | The type of cabinet. | Cabinet Type |
| EIA-310-D Compliant? | Is the cabinet compliant with EIA-310-D specifications? | YesNo Type |
| Mounting Flange Holes | This describes the type of mounting flange hole. | Mounting Hole Type |

TABLE 42-continued

Cabinet Properties

| Name | Description | Type |
|---|---|---|
| Mounting Flange Dimensions | | |
| Inside Width (mm) | This value describes the inside width of the mounting flange in millimeters. | numeric |
| Hole-to-Hole Width (mm) | This is the distance from the mounting hole of one flange to the corresponding mounting hole on the opposite flange, in millimeters. | numeric |
| Outside Width (mm) | This is the outside width of the mounting flange in millimeters. | numeric |
| Rack Depth | | |
| Flange to Bulkhead (mm) | The distance from the flange to the bulkhead in millimeters. | numeric |
| Total System Depth (mm) | The total system depth in millimeters. | numeric |
| Installed Depth (mm) | This describes the installed depth in millimeters. | numeric |
| Thermals | | |
| Number of Fans | The number of fans in the cabinet. | numeric |
| Airflow | The volume of air flowing through the cabinet. | Airflow Type |
| Fan Locations | The location fans about the server cabinet. | Fan Location Type List |
| Doors | | |
| Number of Doors | The number of doors on the cabinet. | numeric |
| Door Lockable? | Describes whether the door can be locked. | YesNo Type |

TABLE 43

Cabinet Relationship Types

| Relationship Type | Label | Target Component Types |
|---|---|---|
| Stores | Stores | Computing Hardware |

Computing Hardware

Computing Hardware is a subtype of Hardware.

The Computing Hardware component type represents a class of components that is based on computing capabilities.

TABLE 44

Computing Hardware Relationship Types

| Relationship Type | Label | Target Component Types |
|---|---|---|
| Contains | Contained by | Computing Hardware |
| Stores | Is stored in | Cabinet |

Network Device

Network Device is a subtype of Computing Hardware.

Use the Network Device component type to describe a device that is directly connected to a network.

TABLE 45

Network Device Properties

| Name | Description | Type |
|---|---|---|
| Network Device Information | | |
| Grid Location | The grid location of the network device. | string |

TABLE 46

Network Device Relationship Types

| Relationship Type | Label | Target Component Types |
|---|---|---|
| Consists Of | Has Part | Network Interface |
| Consists Of | Is part of | Network |

Storage Device

Storage Device is a subtype Network Device.

Use the Storage Device component type to represent a stand-alone device that stores data.

Disk Array

Disk Array is a subtype of Storage Device.

Use the Disk Array component type to describe a storage device that stores data on disk drives.

TABLE 47

Disk Array Properties

| Name | Description | Type |
|---|---|---|
| Performance Metrics | | |
| Disk Capacity Free Units | | |
| Timestamp | The last date and time this metric was gathered. | datetime |
| Value | The latest value of this metric. | numeric |
| Units | The units this metric is measured in. | Capacity Unit Type |
| Disk Capacity Used Units | | |
| Timestamp | The last date and time this metric was gathered. | datetime |
| Value | The latest value of this metric. | numeric |
| Units | The units this metric is measured in. | Capacity Unit Type |
| Disk Used Percent | | |
| Timestamp | The last date and time this metric was gathered. | datetime |
| Value | The latest value of this metric. | numeric |

TABLE 48

Disk Array Relationship Types

| Relationship Type | Label | Target Component Types |
|---|---|---|
| Stored On | stores on | Datastore |

Backup Device

Backup Device is a subtype of Storage Device.

Use the Backup Device component type to describe a storage device that uses removable media to archive data.

Tape Backup

Tape Backup is a subtype of Backup Device.

Use the Tape Backup component type to describe a backup device that stores data onto a tape for archival.

Firewall

Firewall is a subtype of Network Device.

Use the Firewall component type to describe a network device that provides filtered network access.

Load Balancer

Load Balancer is a subtype of Network Device.

Use the Load Balancer component type to describe a network device that provides load-balancing services.

Router

Router is a subtype of Network Device.

Use the Router component type to describe a network device that connects one or more networks.

Switch

Switch is a subtype of Network Device.

Use the Switch component type to describe a network device that manages one or more networks and/or network data types.

SAN Switch

SAN Switch is a subtype of Switch.

Use the SAN Switch component type to describe a device that manages a set of SANs.

Computer

Computer is a subtype of Computing Hardware.

Use the Computer component type to describe a general-purpose computing device.

TABLE 49

Computer Properties

| Name | Description | Type |
| --- | --- | --- |
| Computer Information | | |
| Operating System | The operating system this component is running. | OS Name Type |
| RAM (MB) | The amount of memory in this component. | numeric |
| CPU Type | The type of CPU in this component. | CPU Type |
| CPU Count | The number of CPUs in this component. | numeric |
| CPU Clock Speed | The clock speed of the CPUs. | numeric |
| CPU Clock Speed Unit | The unit that clock speed is listed in. | CPU Clock Speed Unit Type |
| Disk Count | The number of internal disks in this component. | numeric |
| Disk Capacity | The total capacity of all internal disk drives in this component. | numeric |
| Disk Capacity Units | The units that disk capacity is stated in. | Capacity Unit Type |

TABLE 49-continued

Computer Properties

| Name | Description | Type |
| --- | --- | --- |
| Performance Metrics | | |
| CPU Percent | | |
| Timestamp | The last date and time this metric was gathered. | datetime |
| Value | The latest value of this metric. | numeric |
| Disk Capacity Free Units | | |
| Timestamp | The last date and time this metric was gathered. | datetime |
| Value | The latest value of this metric. | numeric |
| Units | The units this metric is measured in. | Capacity Unit Type |
| Disk Capacity Used Units | | |
| Timestamp | The last date and time this metric was gathered. | datetime |
| Value | The latest value of this metric. | numeric |
| Units | The units this metric is measured in. | Capacity Unit Type |
| Disk Used Percent | | |
| Timestamp | The last date and time this metric was gathered. | datetime |
| Value | The latest value of this metric. | numeric |

TABLE 50

Computer Relationship Types

| Relationship Type | Label | Target Component Types |
| --- | --- | --- |
| Runs On | Hosts | Module |
| Stored On | stores | Datastore |

Server

Server is a subtype of Computer.

Use the Server component type to describe a computing device that hosts one more software services.

Mainframe

Mainframe is a subtype of Server.

Use the Mainframe component type to represent a legacy computing device that hosts many software services.

Desktop

Desktop is a subtype of Computer.

A Desktop component type is used to describe a computing device that performs work for an individual and is typically installed in a fixed location.

Laptop

Laptop is a subtype of Computer.

A Laptop component type is used to describe a computing device that performs work for an individual and is typically considered to be portable. It contains a display device and keyboard in an integrated unit.

Network

Network is a subtype of Infrastructure Domain.

Use the Network component type to describe a set of devices that enable communication via TCP/IP, NetBios, or other network protocol.

TABLE 51

Network Properties

| Name | Description | Type |
|---|---|---|
| Asset Information | | |
| Product Name | The vendor or internal name of this product. | string |
| Product Version | The product version of this component. | string |
| Product Serial Number | The product serial number of this component. | string |
| Vendor Name | The name of the vendor supplying this module. | string |
| Vendor Sales Phone | The phone number of the vendor supplying this module. | string |
| Vendor Sales Email | The email address of the vendor supplying this module. | string |
| Vendor Support Phone | The vendor's support phone number of this module. | string |
| Vendor Support Email | The vendor's support email address of for this module. | string |
| Financial Information | | |
| Original Purchase Cost | The original purchase price of this component. | numeric |
| Original Purchase Date | The original purchase date of this component. | datetime |
| Performance Information | | |
| Open Incident Count | The number of incidents currently open for this component. | numeric |
| Service Man Hours | The number of service man-hours currently logged against this component. | numeric |

TABLE 52

Network Relationship Types

| Relationship Type | Label | Target Component Types |
|---|---|---|
| Consists Of | Consists of | Network Device |

SAN

SAN is a subtype of Network.

Use the SAN component type to describe a storage area network.

Network Interface

Network Interface is a subtype of Infrastructure Domain.

A Network Interface is used to represent the physical connection point onto a network. A likely subtype of Network Interface would be a Network Interface Card, or NIC.

TABLE 53

Network Interface Properties

| Name | Description | Type |
|---|---|---|
| Asset Information | | |
| Product Name | The vendor or internal name of this product. | string |
| Product Version | The product version of this component. | string |
| Product Serial Number | The product serial number of this component. | string |

TABLE 53-continued

Network Interface Properties

| Name | Description | Type |
|---|---|---|
| Vendor Name | The name of the vendor supplying this module. | string |
| Vendor Sales Phone | The phone number of the vendor supplying this module. | string |
| Vendor Sales Email | The email address of the vendor supplying this module. | string |
| Vendor Support Phone | The vendor's support phone number of this module. | string |
| Vendor Support Email | The vendor's support email address of for this module. | string |
| Financial Information | | |
| Original Purchase Cost | The original purchase price of this component. | numeric |
| Original Purchase Date | The original purchase date of this component. | Datetime |
| Performance Information | | |
| Open Incident Count | The number of incidents currently open for this component. | numeric |
| Service Man Hours | The number of service man-hours currently logged against this component. | numeric |

TABLE 54

Network Interface Relationship Types

| Relationship Type | Label | Target Component Types |
|---|---|---|
| Consists Of | Is part of | Network Device |
| Contains | Contained by | Computing Hardware |

Location Domain

The location Domain is the abstract base type for component types representing the place where components are located.

Location

Location is a subtype of Location Domain.

Use the Location component type to describe a physical location with an address.

TABLE 55

Location Properties

| Name | Description | Type |
|---|---|---|
| Address Information | | |
| Street Address 1 | The street address of the location. | string |
| Street Address 2 | The street address of the location. | string |
| City | The city of the location. | string |
| State | The state of the location. | U.S. State |
| ZIP | The ZIP code of the location. | string |

TABLE 56

Location Relationship Types

| Relationship Type | Label | Target Component Types |
|---|---|---|
| Located In | Located in | Geography |
| Located In | Location of | Hardware |
| Located in | Location of | Business Unit |
| Located in | Location of | Group |

Data Center

Data Center is a subtype of Location.

Use the Data Center component type to describe a building where computing devices are physically located.

Geography

Geography is a subtype of Location Domain.

Use the Geography component type to describe general properties applicable to both Regions and Countries.

TABLE 57

Geography Relationship Types

| Relationship Type | Label | Target Component Types |
|---|---|---|
| Located In | Location of | Location |

Region

Region is a subtype of Geography.

Use the Region component type to represent a geographic region containing one or more states or countries.

TABLE 58

Region Relationship Types

| Relationship Type | Label | Target Component Types |
|---|---|---|
| Consists of | Consists of | Region |

Country

Country is a subtype of Geography.

Use the Country component type to represent a geographic country.

Data Domain

The component types that are descendants of the Data Domain are used to describe any entity that represents an information asset of the enterprise.

Datastore

Datastore is a subtype of Data Domain.

Describes the logical media on which information assets are stored.

TABLE 59

Datastore Relationship Types

| Relationship Type | Label | Target Component Types |
|---|---|---|
| Stored On | Is stored on | Disk Array |
| Stored On | Is stored on | Computer |

Database

Database is a subtype of Datastore.

A Database component type is used to represent a physical data store that serves one or more applications.

TABLE 60

Database Properties

| Name | Description | Type |
|---|---|---|
| Performance Information | | |
| Open Incident Count | The number of incidents currently open for this component. | numeric |
| Service Man Hours | The number of service man-hours currently logged against this component. | numeric |
| Data information | | |
| Catalog | A named group of schemas or database name | string |
| Location | URL used for connection and collection | string |
| Username | Named used for connection and collection | string |
| Driver | JDBC Driver used for collection | string |
| Database ID | Unique ID | String |
| Creation Date | Date of database creation | datetime |
| Last Backup date | Date of last database backup | datetime |
| Space allocated | Allocated space for database | numeric |
| Space Used | Actual space used | numeric |
| Status | Describes status of database | string |
| Environment Type | Type of deployment environment | string |

TABLE 61

Database Relationship Types

| Relationship Type | Label | Target Component Types |
|---|---|---|
| Manages | Is managed by | Database Server |
| Uses | Is used by | Module |
| Consists of | Consists of | Schemas |
| Consists of | Consists of | Tablespaces |
| Consists of | Consists of | Datafiles |

Data Warehouse

Data Warehouse is a subtype of Database.

The Data Warehouse component type is used to represent a subject-oriented, integrated, time-variant, non-volatile store of data collected from other systems that becomes the foundation for decision support and data analysis.

VSAM

VSAM is a subtype of Datastore.

A VSAM component type is used to represent an IBM VSAM data store that serves one or more applications.

TABLE 62

VSAM Properties

| Name | Description | Type |
|---|---|---|
| Data information | | |
| Creation Date | Date of VSAM creation | datetime |
| Last Backup date | Date of last VSAM backup | datetime |
| Space allocated | Allocated space for VSAM | numeric |
| Space Used | Actual space used | numeric |
| Status | Describes status VSAM system | string |
| Environment Type | Type of deployment environment | string |

TABLE 63

VSAM Relationship Types

| Relationship Type | Label | Target Component Types |
|---|---|---|
| Uses | Is used by | Module |

Partitioned Dataset
  Partitioned Dataset a subtype of Datastore.
  A Partitioned Dataset component type is used to represent an IBM PDS data store that serves one or more applications.

TABLE 64

Partition Dataset Properties

| Name | Description | Type |
|---|---|---|
| Creation Date | Date of PDS creation | datetime |
| Last Backup date | Date of last PDS backup | datetime |
| Space allocated | Allocated space for PDS | numeric |
| Space Used | Actual space used | numeric |
| Status | Describes status VSAM system | string |
| Environment Type | Type of deployment environment | string |

TABLE 65

Partition Dataset Relationship Types

| Relationship Type | Label | Target Component Types |
|---|---|---|
| Uses | Is used by | Module |
| Consists of | Consists of | File |

File
  File is a subtype of Datastore.
  A File component type is used to represent a physical data store that represents a single sequential file.

TABLE 66

File Properties

| Name | Description | Type |
|---|---|---|
| Data information | | |
| Creation Date | Date of file creation | datetime |
| Last Backup date | Date of last file backup | datetime |
| Space allocated | Allocated space for file | numeric |
| Space Used | Actual space used | numeric |
| Status | Describes status of file | string |
| Environment Type | Type of deployment environment | string |

TABLE 67

File Relationship Types

| Relationship Type | Label | Target Component Types |
|---|---|---|
| Uses | Is used by | Module |

QSAM
  QSAM is a subtype of File.
  A QSAM component type is used to represent a physical data store that represents a single QSAM sequential file.

XML File
  XML File is a subtype of File.
  A XML File component type is used to represent a physical data store that represents a single sequential file containing XML data.

Record Oriented File
  Record Oriented File is a subtype of File.
  A Record Oriented File component type is used to represent a physical data store that represents a single sequential file containing records with fields.

Data Object
  Data Object is a subtype of Data Domain.
  A Data Object component type is used to represent a data elements of a database.

TABLE 68

Data Object Properties

| Name | Description | Type |
|---|---|---|
| Comments | These are comments that are not necessarily a part of the component's description. | note |
| Data Information | | |
| Object name | Name of Data Object | string list |
| Purpose | Purpose of Data Object | Note |
| Creation Date | Date created on | Datetime |
| Owner | Name of owner | String |
| Last modified date | Date of last modification of definition | Datetime |
| Status | Current status | String |
| SQL Source | Copy of SQL Source | note |
| Comments | Comments | Note |

TABLE 69

Data Object Relationship Types

| Relationship Type | Label | Target Component Types |
|---|---|---|
| Permission | Is secured by | Grant |
| Consists of | Is part of | Schema |

Table

Table is a subtype of Data Object.

The Table component type is used to represent a named set of rows in a database.

TABLE 70

Table Properties

| Name | Description | Type |
| --- | --- | --- |
| Catalog | A named group of schemas | string |
| Schema | Schema containing the table | sting |
| Primary Key | Name of primary key | string |
| Primary Key Column | Column location of primary key | string |
| Number of rows | Number of rows in table | numeric |
| Space Allocated | Space allocated for table | numeric |
| Space Used | Space used by table | numeric |
| Row Length | Row length maximum | numeric |
| Average Row Length | Average row length | numeric |
| Last Backup Date | Last backup date | datetime |
| Partitioned | Partitioned status | yesno |
| Table Organization Type | Type of organization | string |
| Permanent/Temporary | Status | string |
| Table Type | Type of table | string |

TABLE 71

Table Relationship Types

| Relationship Type | Label | Target Component Types |
| --- | --- | --- |
| Consists of | Consists of | columns |
| Fires | Fires | Trigger |
| References | Referenced by | Trigger |
| References | Referenced by | Stored Procedure |
| References | Referenced by | View |
| References | Referenced by | Module |
| Index | Indexed by | Index |
| Alias | Has a alias | Synonym |
| Constraint | Has constraint | Foreign Key Constraint |
| Constraint | Has constraint | Primary Key Constraint |
| Constraint | Has constraint | Unique Key Constraint |
| Constraint | Has constraint | Check Constraint |
| Constraint | Is referenced by | Foreign Key Constraint |

View

View is a subtype of Data Object.

The View component type is used to represent a named set of rows in a database.

TABLE 72

View Properties

| Name | Description | Type |
| --- | --- | --- |
| Catalog | A named group of schemas | string |
| Schema | Schema containing the table | string |
| Type | View type | string |
| Remarks | Remarks | string |
| Primary Key Name | Name of primary key | string |
| Primary Key Column | Column location of primary key | Sting |

TABLE 73

View Relationship Types

| Relationship Type | Label | Target Component Types |
| --- | --- | --- |
| Consists of | Consists of | columns |
| Fires | Fires | Trigger |
| References | Referenced by | Trigger |
| References | Referenced by | Stored Procedure |
| References | Referenced by | View |
| References | Referenced by | Module |
| Index | Indexed by | Index |
| Alias | Has a alias | Synonym |
| Constraint | Has constraint | Check Constraint |

Stored Procedure

A Stored Procedure is a subtype of Data Object.

The Stored Procedure component type is used to represent function or procedure stored in a schema

TABLE 74

Stored Procedure Relationship Types

| Relationship Type | Label | Target Component Types |
| --- | --- | --- |
| References | Is referenced by | Trigger |
| References | Is referenced by | Stored Procedure |
| Alias | Has an alias | Synonym |
| References | References | Table |
| References | References | View |
| References | References | Type |
| References | References | Column |
| References | References | synonym |

Trigger

A Trigger is a subtype of Data Object.

The Trigger component type is used to represent a named rule in a schema

TABLE 75

Trigger Properties

| Name | Description | Type |
| --- | --- | --- |
| Triggering event | Access type that causes trigger to fire | string |
| Trigger Type | Type of access that fires trigger | string |
| Status | Current Trigger Status | Trigger status |

TABLE 76

Trigger Relationship Types

| Relationship Type | Label | Target Component Types |
| --- | --- | --- |
| References | References | Stored Procedure |
| Fires | Fired by | Table |
| Fires | Fired by | View |
| Alias | Has an alias | Synonym |
| References | References | Table |
| References | References | View |
| References | References | Type |
| References | References | Column |
| References | References | synonym |

Index

An Index is a subtype of Data Object.

The Index component type is used to represent a cross references into a table or a views in a schema

TABLE 77

Index Properties

| Name | Description | Type |
|---|---|---|
| Index Type | Type of indexing used | string |
| Column List | Columns indexed | string list |
| Unique | Is index unique | Yes/no |

TABLE 78

Index Relationship Types

| Relationship Type | Label | Target Component Types |
|---|---|---|
| Index | indexes | Table |
| Index | indexes | View |

Synonym

A Synonym is a subtype of Data Object.

The Synonym component type is used to alias data objects in a schema

TABLE 79

Index Properties

| Name | Description | Type |
|---|---|---|
| Public | Is it public | Yes/no |

TABLE 80

Synonym Relationship Types

| Relationship Type | Label | Target Component Types |
|---|---|---|
| Alias | Has an alias | Synonym |
| Alias | Is Alias for | Table |
| Alias | Is Alias for | View |
| Alias | Is Alias for | Type |
| Alias | Is Alias for | Column |
| Alias | Is Alias for | Stored Procedure |
| Alias | Is Alias for | Trigger |
| Alias | Is Alias for | Data Object |

Type

A Type is a subtype of Data Object.

The Type component type is used to represent classes of data in a schema

TABLE 81

Type Properties

| Name | Description | Type |
|---|---|---|
| Attributes | Attributes of the type | string |
| Methods | Methods of the type | string |
| Final or Instantiate | Final or instantiate | string |

TABLE 82

Type Relationship Types

| Relationship Type | Label | Target Component Types |
|---|---|---|
| References | Is used by | Stored Procedure |
| References | Is used by | Trigger |
| References | Is used by | Type |
| References | Is used by | Column |
| Alias | Has an alias | Synonym |
| Type | Is subtype of | Type |
| Type | Is supertype of | Type |
| Classify | Defines class | Column |

Oracle Data Object

Oracle Data Object is a subtype of Data Object.

An Oracle Data Object component type is used to represent a data objects specific to Oracle databases SQL Server Data Object SQL Server Data Object is a subtype of Data Object.

A SQL Server Data Object component type is used to represent a data objects specific to Microsoft SQL Server databases DB2 Server Data Object DB2 Data Object is a subtype of Data Object.

A DB2 Data Object component type is used to represent a data objects specific to Microsoft SQL Server databases Schema Schema is a subtype of Data Domain.

A schema component type is used to represent a named group of data.

TABLE 83

Schema Properties

| Name | Description | Type |
|---|---|---|
| Schema Name | Name of schema | string |
| Create Date | Date schema created | datetime |

TABLE 84

Schema Relationship Types

| Relationship Type | Label | Target Component Types |
|---|---|---|
| Consists of | Consists of | Table |
| Consists of | Consists of | View |
| Consists of | Consists of | Stored Procedure |
| Consists of | Consists of | Trigger |
| Consists of | Consists of | Index |
| Consists of | Consists of | Synonym |
| Consists of | Consists of | Type |
| Consists of | Is part of | Database |

Data Grant

Data Grant is a subtype of Data Domain.

A data grant component type is used to represent the authorization to execute a given operation n a Data Object.

TABLE 85

Data Grant Properties

| Name | Description | Type |
|---|---|---|
| Privileges | List of privileges | String list |
| Date | Date Granted | datetime |

TABLE 86

Data Grant Relationship Types

| Relationship Type | Label | Target Component Types |
|---|---|---|
| Permission | Granted to | Data Role |
| Permission | Granted to | Data Login |
| Permission | Provides access to | Data Object |
| Permission | Provides access to | Table |
| Permission | Provides access to | View |
| Permission | Provides access to | Stored Procedure |
| Permission | Provides access to | Trigger |
| Permission | Provides access to | Index |
| Permission | Provides access to | Synonym |
| Permission | Provides access to | Type |
| Permission | Provides access to | Database |

Data Role

Data Role is a subtype of Data Domain.

A data role component type is used to represent a named user (person or program) who accesses data.

TABLE 87

Data Role Properties

| Name | Description | Type |
|---|---|---|
| Role Name | Authorization ID | string |

TABLE 88

Data Role Relationship Types

| Relationship Type | Label | Target Component Types |
|---|---|---|
| Permission | Is Granted | Data Grant |

Data Login

Data Login is a subtype of Data Domain.

A Data Login component type is used to represent the name used to gain access to data.

TABLE 89

Data Login Properties

| Name | Description | Type |
|---|---|---|
| Authentication ID | User ID | string |
| Login Name | Name used | string |
| Creation Date | Date Login was created | datetime |
| Last Login Date | Date of last successful login | datetime |
| Login Status | Status of name | string |
| Authentication Method | Mechanism to verify login | string |

TABLE 90

Data Login Relationship Types

| Relationship Type | Label | Target Component Types |
|---|---|---|
| Permission | Is Granted | Data Grant |

Tablespace

Tablespace is a subtype of Data Domain.

A Tablespace component type is used to represent a logical group of data files.

TABLE 91

Tablespace Properties

| Name | Description | Type |
|---|---|---|
| Size | Amount of storage | numeric |
| Number of data files | Number of file | numeric |
| Tablespace Type | Type | Tablespace type |
| Status | Denotes availability | Tablespace status |
| Storage Notes | Notes | note |

TABLE 92

Tablespace Relationship Types

| Relationship Type | Label | Target Component Types |
|---|---|---|
| Consists of | Is part of | Database |

Column

Column is a subtype of Data Domain.

A Column component type is used to represent columns in a relational database.

TABLE 93

Column Properties

| Name | Description | Type |
|---|---|---|
| Data Type | Data type of column | string |
| Column Comments | Comments | string |
| Length | Length of column | numeric |
| Precision | Total digits | numeric |
| Scale | Digits to right of decimal | numeric |

TABLE 94

Column Relationship Types

| Relationship Type | Label | Target Component Types |
|---|---|---|
| Consists of | Is part of | Table |
| Consists of | Is part of | View |
| Classify | Is class | Type |
| Constraint | Constrained by | Set of Values |

Record

Record is a subtype of Data Domain.

A Record component type is used to represent records in a Record Oriented File.

TABLE 95

Record Properties

| Name | Description | Type |
|---|---|---|
| Record Type | Type of Record | string |
| Length | Length of record | numeric |
| Sequence | Sequence in file | numeric |

TABLE 96

Record Relationship Types

| Relationship Type | Label | Target Component Types |
|---|---|---|
| Consists of | Is part of | Record Oriented File |
| Consists of | Consists of | Field |

Field

Field is a subtype of Data Domain.

A Field component type is used to represent records in a Record Oriented File.

TABLE 97

Field Properties

| Name | Description | Type |
|---|---|---|
| Record Type | Type of Record | string |
| Sequence | Sequence in record | numeric |
| Length | Length of record | numeric |
| From | Beginning position on Record | numeric |
| To | Ending position on Record | Numeric |
| Business Oriented Name | Business Oriented Name | string |
| Cobol Picture | Cobol Picture | sting |
| Notes | Notes | Note |

TABLE 98

Field Relationship Types

| Relationship Type | Label | Target Component Types |
|---|---|---|
| Consists of | Is part of | Record |
| Constraint | Constrained by | Set of Values |

Constraint

Constraint is a subtype of Data Domain.

A Constraint component type is used to represent the named rule that identifies sets of valid data values.

TABLE 99

Constraint Properties

| Name | Description | Type |
|---|---|---|
| Constraint Text | Descriptive text | string |
| Columns constrained | What columns are affected | string list |
| Status | Constraint status | Constraint status type |
| SQL Source | Copy of SQL Source | note |
| Name | Constraint name | String |
| Creation date | Dated created | datetime |

TABLE 100

Constraint Relationship Types

| Relationship Type | Label | Target Component Types |
|---|---|---|
| Constrained | Constrains | Table |

Unique Key Constraint

Unique Key Constraint is a subtype of Constraint.

A Unique Key Constraint component type is used to represent the named rule that identifies sets of valid data values.

Primary Key Constraint

Primary Key Constraint is a subtype of Constraint.

A Primary Key Constraint component type is used to represent the named rule that identifies sets of valid data values.

Foreign Key Constraint

Foreign Key Constraint is a subtype of Constraint.

A Foreign Key Constraint component type is used to represent the named rule that identifies sets of valid data values.

TABLE 101

Foreign Key Constraint Relationship Types

| Relationship Type | Label | Target Component Types |
|---|---|---|
| Constrained | References constraint | Table |

Check Constraint

Check Constraint is a subtype of Constraint.

A Check Constraint component type is used to represent the named rule that identifies sets of valid data values.

TABLE 102

Check Constraint Relationship Types

| Relationship Type | Label | Target Component Types |
|---|---|---|
| Constrained | Constrains | View |

Set of Values

Set of Values is a subtype of Constraint.

A Set of Values component type is used to represent the set of valid data values. It is recommended that subtypes be created from this subtype to define specifics of the set of valid values that apply.

TABLE 103

Set of Values Properties

| Name | Description | Type |
|---|---|---|
| SOV Text | Descriptive text | string |
| Name | Business name | String |
| Creation date | Dated created | datetime |

TABLE 104

Set of Values Relationship Types

| Relationship Type | Label | Target Component Types |
|---|---|---|
| Constrained | Constrains | Column |
| Constrained | Constrains | Field |

Policy Domain

The component types within the Policy Domain are used to describe the plans, principles, obligations, agreements, contracts, and requirements which guide the management of the enterprise.

Property Types

Custom property types may be created to be utilized with the reference model. For example:

| Property Type | Valid Values |
|---|---|
| Airflow Type | 1U (32-36 CFM/U) |
| Describes the type of airflow used by a cabinet. | 2U (39-45 CFM/U) |
|  | 4U (38-40 CFM/U) |
|  | 5U (45-50 CFM/U) |
|  | 7U (25-43 CFM/U) |
| Application Lifecycle Phase Type | Vision |
| Application lifecycle phases. | Planning |
|  | Development |
|  | Testing |
|  | Stabilization |
|  | Deploying |
|  | Supporting |
|  | Retiring |
| Cabinet Type | 4-Post (Enclosed) |
| This describes the type of cabinet. | 2-Post (Open Air) |
| Capacity Unit Type | Kilobytes |
| Units of capacity. | Megabytes |
|  | Gigabytes |
|  | Terabytes |
|  | Petabytes |
| CPU Clock Speed Unit Type | Kilohertz (KHz) |
| Units of CPU clock speed. | Megahertz (MHz) |
|  | Gigahertz (GHz) |
| Employee Status Type | Full Time |
| Employee status. | Part Time |
|  | Leave of Absence |
|  | Terminated |
| Fan Location Type | Top |
| Location of fan(s) on a server cabinet. | Front |
|  | Back |
|  | Bottom |
|  | Left Side |
|  | Right Side |
|  | None or N/A |
| Interval Type | Days |
| Granularity of intervals. | Hours |
|  | Minutes |
| Mounting Hole Type | Square |
| The types of mounting holes in a cabinet. | Round |
|  | Tapped |

-continued

| Property Type | Valid Values |
|---|---|
| OS Name Type | Microsoft Windows 2000 Server |
| The name of the operating system. |  |
| Process Step Type | Manual |
| The type of process step. | Automated |
| Project Phase Type | Planning |
| The phase of a project. | Requirements Gathering and Analysis |
|  | Construction Phase |
|  | Transition Phase |
|  | Deployment Phase |
| Task Status Type | Proposed |
| Status values for a task. | Pending Approval |
|  | In Progress |
|  | On Hold |
|  | Complete |
| U.S. State Type | Any valid abbreviation of the |
| State of the United States of America | United States of America. |
| YesNo Type | Yes |
| Yes or No value. | No |

What is claimed is:

1. A method of creating a reference model for an enterprise architecture using a system comprising a modeling computer and a database computer, comprising:
   representing the enterprise architecture using a data model and the modeling computer, the data model comprising:
   a first set of component types, each of the first set of component types corresponding to a domain and comprising a first set of properties associated with the domain to which the first component type corresponds, wherein each domain corresponds to a logical separation of entities and relationships within the enterprise architecture and wherein each domain is associated with a second set of component types, the second set of component types comprising a hierarchy of subtypes corresponding to that domain and each of the subtypes corresponds to a physical or logical entity that is related to that domain and comprises a second set of properties associated with that entity, and wherein each domain is further associated with a set of relationship types, wherein each of the set of relationships types corresponds to a relationship between entities of the associated domain and comprises a third set of properties associated with that relationship, wherein the second set of component types and the set of relationship types associated with each domain serve as a framework for instantiating components and relationships to model the enterprise architecture and wherein representing the enterprise architecture further comprises:
   instantiating a set of components from each of the first set of component types, the second set of component types and the set of relationships types, and assigning values to the first set of properties, second set of properties and third set of properties of the instantiated components and relationships based on the enterprise architecture,
   wherein each instantiated component comprises a check logic for determining the validity of values of the sets of properties; and
   storing each of the set of the instantiated set of components, relationships and properties at the database computer using a table schema comprising a component table storing each of the components and an association between each component and a corresponding component type and a relationship table storing each relationship, wherein each of the relationships is associated with its corresponding relationship type;

wherein each instantiated relationship comprises a check logic for determining the validity of relationship;

wherein the table schema comprises:

a propertyDefinition table, a componentType table, the component table, a PropertyCategory table, a propertyValue table, a relationshipType table and the relationship table, wherein the ComponentType table comprises a set of columns related to fields of a component type, wherein each component is linked to its type of component through a property field, whereby all instantiated components of a given type contain the same set of properties and check logic, wherein the RelationshipType table comprises a set of columns related to fields of a relationship type, wherein each relationship is linked to its type of relationship through a property field, whereby all instantiated relationships of a given type contain the same set of properties and check logic, wherein the PropertyCategory table comprises a set of columns related to the definition of a property, wherein each property is linked to its type of relationship through a property field, whereby all instantiated relationships of a given type contain the same set of properties and check logic, wherein the PropertyDefinition table comprises a set of definitions of particular properties, wherein one or more properties contains a link to a field in and a propertyValue table, wherein each property value comprises a link to a property definition in the propertyDefinition table and one of a link to a field in the ComponentType table or the RelationshipType table.

2. The method of claim 1, wherein the set of domains comprises process, initiative, organization, application, location, infrastructure, data and policy.

3. The method of claim 1, wherein at least one of the second component types is associated with first check logic, the first check logic operable to check the values of one or more of the second set of properties of one or more of the set of components instantiated from the at least one of the second component types and at least one of the relationship types is associated with second check logic, the second check logic operable to check the values of one or more of the third set of properties of one or more of the set of relationships instantiated from the at least one of the relationship types.

4. The method of claim 3, wherein the set of relationship types comprises intradomain and interdomain relationship types and cardinality constraints on each of the relationship types in the set of relationship types.

5. The method of claim 1, wherein each component is represented in the component table, wherein each component stored in the component table is linked to a type of component, wherein altering the model to include a new property field comprises the steps of:

adding a row to a table in the data schema, wherein the row comprises one or more fields containing the definition of the property, wherein the property definition is linked to a componentID field in the componentType table, whereby the added property field is associated with all components having the same component type.

6. The method of claim 5, wherein each component type is represented in the component type table, wherein each component type stored in the component type table is linked to a property in the property table.

7. A system comprising a database computer and a modeling computer, the system comprising a tangible computer readable medium comprising computer executable instruction for:

representing the enterprise architecture using a data model and the modeling computer, the data model comprising:

a first set of component types, each of the first set of component types corresponding to a domain and comprising a first set of properties associated with the domain to which the first component type corresponds, wherein each domain corresponds to a logical separation of entities and relationships within the enterprise architecture and wherein each domain is associated with a second set of component types, the second set of component types comprising a hierarchy of subtypes corresponding to that domain and each of the subtypes corresponds to a physical or logical entity that is related to that domain and comprises a second set of properties associated with that entity, and wherein each domain is further associated with a set of relationship types, wherein each of the set of relationships types corresponds to a relationship between entities of the associated domain and comprises a third set of properties associated with that relationship, wherein the second set of component types and the set of relationship types associated with each domain serve as a framework for instantiating components and relationships to model the enterprise architecture and wherein representing the enterprise architecture further comprises:

instantiating a set of components from each of the first set of component types, the second set of component types and the set of relationships types, and assigning values to the first set of properties, second set of properties and third set of properties of the instantiated components and relationships based on the enterprise architecture, wherein each instantiated component comprises a check logic for determining the validity of values of the sets of properties; and storing each of the set of the instantiated set of components, relationships and properties at the database computer using a table schema comprising a component table storing each of the components and an association between each component and a corresponding component type and a relationship table storing each relationship, wherein each of the relationships is associated with its corresponding relationship type;

wherein each instantiated relationship comprises a check logic for determining the validity of relationship;

wherein the table schema comprises:

a propertyDefinition table, a componentType table, the component table, a PropertyCategory table, a propertyValue table, a relationshipType table and the relationship table, wherein the ComponentType table comprises a set of columns related to fields of a component type, wherein each component is linked to its type of component through a property field, whereby all instantiated components of a given type contain the same set of properties and check logic, wherein the RelationshipType table comprises a set of columns related to fields of a relationship type, wherein each relationship is linked to its type of relationship through a property field, whereby all instantiated relationships of a given type contain the same set of properties and check logic, wherein the PropertyCategory table comprises a set of columns related to the definition of a property, wherein each property is linked to its type of relationship through a property field, whereby all instantiated relationships of a given type contain the same set of properties and check logic, wherein the PropertyDefinition table comprises a set of definitions of particular properties, wherein one or more properties contains a link to a field in and a propertyValue table, wherein each property value comprises a link to a property definition in the propertyDefinition table and one of a link to a field in the ComponentType table or the RelationshipType table.

8. The system of claim 7, wherein the set of domains comprises process, initiative, organization, application, location, infrastructure, data and policy.

9. The system of claim 7, wherein at least one of the second component types is associated with first check logic, the first check logic operable to check the values of one or more of the second set of properties of one or more of the set of components instantiated from the at least one of the second component types and at least one of the relationship types is associated with second check logic, the second check logic operable to check the values of one or more of the third set of properties of one or more of the set of relationships instantiated from the at least one of the relationship types.

10. The system of claim 9, wherein the set of relationship types comprises intradomain and interdomain relationship types and cardinality constraints on each of the relationship types in the set of relationship types.

11. The system of claim 7, wherein each component is represented in the component table, wherein each component stored in the component table is linked to a type of component, wherein altering the model to include a new property field comprises the steps of:

adding a row to a table in the data schema, wherein the row comprises one or more fields containing the definition of the property, wherein the property definition is linked to a componentID field in the componentType table, whereby the added property field is associated with all components having the same component type.

12. The system of claim 11, wherein each component type is represented in the component type table, wherein each component type stored in the component type table is linked to a property in the property table.

13. A tangible computer readable medium comprising computer executable instruction for:

representing the enterprise architecture using a data model and the modeling computer, the data model comprising:

a first set of component types, each of the first set of component types corresponding to a domain and comprising a first set of properties associated with the domain to which the first component type corresponds, wherein each domain corresponds to a logical separation of entities and relationships within the enterprise architecture and wherein each domain is associated with a second set of component types, the second set of component types comprising a hierarchy of subtypes corresponding to that domain and each of the subtypes corresponds to a physical or logical entity that is related to that domain and comprises a second set of properties associated with that entity, and wherein each domain is further associated with a set of relationship types, wherein each of the set of relationships types corresponds to a relationship between entities of the associated domain and comprises a third set of properties associated with that relationship, wherein the second set of component types and the set of relationship types associated with each domain serve as a framework for instantiating components and relationships to model the enterprise architecture and wherein representing the enterprise architecture further comprises:

instantiating a set of components from each of the first set of component types, the second set of component types and the set of relationships types, and assigning values to the first set of properties, second set of properties and third set of properties of the instantiated components and relationships based on the enterprise architecture, wherein each instantiated component comprises a check logic for determining the validity of values of the sets of properties; and storing each of the set of the instantiated set of components, relationships and properties at the database computer using a table schema comprising a component table storing each of the components and an association between each component and a corresponding component type and a relationship table storing each relationship, wherein each of the relationships is associated with its corresponding relationship type;

wherein each instantiated relationship comprises a check logic for determining the validity of relationship;

wherein the table schema comprises:

a propertyDefinition table, a componentType table, the component table, a PropertyCategory table, a propertyValue table, a relationshipType table and the relationship table, wherein the ComponentType table comprises a set of columns related to fields of a component type, wherein each component is linked to its type of component through a property field, whereby all instantiated components of a given type contain the same set of properties and check logic, wherein the RelationshipType table comprises a set of columns related to fields of a relationship type, wherein each relationship is linked to its type of relationship through a property field, whereby all instantiated relationships of a given type contain the same set of properties and check logic, wherein the PropertyCategory table comprises a set of columns related to the definition of a property, wherein each property is linked to its type of relationship through a property field, whereby all instantiated relationships of a given type contain the same set of properties and check logic, wherein the PropertyDefinition table comprises a set of definitions of particular properties, wherein one or more properties contains a link to a field in and a propertyValue table, wherein each property value comprises a link to a property definition in the propertyDefinition table and one of a link to a field in the ComponentType table or the RelationshipType table.

14. The computer readable medium of claim 13, wherein the set of domains comprises process, initiative, organization, application, location, infrastructure, data and policy.

15. The computer readable medium of claim 13, wherein at least one of the second component types is associated with first check logic, the first check logic operable to check the values of one or more of the second set of properties of one or more of the set of components instantiated from the at least one of the second component types and at least one of the relationship types is associated with second check logic, the second check logic operable to check the values of one or more of the third set of properties of one or more of the set of relationships instantiated from the at least one of the relationship types.

16. The computer readable medium of claim 15, wherein the set of relationship types comprises intradomain and interdomain relationship types and cardinality constraints on each of the relationship types in the set of relationship types.

17. The computer readable medium of claim 13, wherein each component is represented in the component table, wherein each component stored in the component table is linked to a type of component, wherein altering the model to include a new property field comprises the steps of:

adding a row to a table in the data schema, wherein the row comprises one or more fields containing the definition of the property, wherein the property definition is linked to a componentID field in the componentType table, whereby the added property field is associated with all components having the same component type.

18. The computer readable medium of claim 17, wherein each component type is represented in the component type table, wherein each component type stored in the component type table is linked to a property in the property table.

* * * * *